United States Patent
Kalevo

(10) Patent No.: US 10,542,257 B2
(45) Date of Patent: Jan. 21, 2020

(54) ENCODERS, DECODERS AND METHODS EMPLOYING QUANTIZATION

(71) Applicant: GURULOGIC MICROSYSTEMS OY, Turku (FI)

(72) Inventor: Ossi Kalevo, Akaa (FI)

(73) Assignee: Gurulogic Microsystems Oy (FI)

( * ) Notice: Subject to any disclaimer, the term of this patent is extended or adjusted under 35 U.S.C. 154(b) by 0 days.

(21) Appl. No.: 16/224,514

(22) PCT Filed: Jul. 17, 2017

(86) PCT No.: PCT/EP2017/025215
§ 371 (c)(1),
(2) Date: Dec. 18, 2018

(87) PCT Pub. No.: WO2018/010852
PCT Pub. Date: Jan. 18, 2018

(65) Prior Publication Data
US 2019/0182484 A1  Jun. 13, 2019

(30) Foreign Application Priority Data
Jul. 15, 2016 (GB) .................. 1612365.5

(51) Int. Cl.
*H04N 19/124* (2014.01)
*H04N 19/136* (2014.01)
*H04N 19/176* (2014.01)

(52) U.S. Cl.
CPC ......... *H04N 19/124* (2014.11); *H04N 19/136* (2014.11); *H04N 19/176* (2014.11)

(58) Field of Classification Search
CPC .. H04N 19/124; H04N 19/136; H04N 19/176; H04N 19/147; H04N 19/46
See application file for complete search history.

(56) References Cited

U.S. PATENT DOCUMENTS 6,404,933 B1   6/2002  Yamamoto
9,135,723 B1 *  9/2015  Guo ................... H04N 19/124
(Continued)

FOREIGN PATENT DOCUMENTS

GB    2503295 B    8/2014
GB    2516426 B   10/2015
(Continued)

OTHER PUBLICATIONS

Notification of Transmittal of the International Preliminary Report on Patentability issued in International Application No. PCT/EP2017/025215 dated Oct. 2, 2018.
(Continued)

*Primary Examiner* — Nam D Pham
(74) *Attorney, Agent, or Firm* — Eric L. Sophir; Dentons US LLP

(57) ABSTRACT

A method of encoding input data to generate corresponding encoded data includes: setting one or more values of a quality parameter for the plurality of data portions in a portion-specific manner; analysing the plurality of data portions and selecting at least one encoding method and at least two different quantization strengths for encoding the plurality of data portions, based upon a given value of the quality parameter set for the given data portion; encoding the plurality of data portions to generate corresponding encoded data portions, wherein at least two data portions are encoded by an encoding method and different quantization strengths, for a same value of the quality parameter for the at least two data portions; aggregating the encoded data portions to generate encoded data; and assembling information indicative of the at least two quantization strengths and the one or more values of the quality parameter into the encoded data.

47 Claims, 6 Drawing Sheets

(56) References Cited

U.S. PATENT DOCUMENTS

| | | |
|---|---|---|
| 2014/0092956 A1 | 4/2014 | Panusopone et al. |
| 2014/0112591 A1 | 4/2014 | Kalevo et al. |
| 2015/0078441 A1 | 3/2015 | Han et al. |

FOREIGN PATENT DOCUMENTS

| | | |
|---|---|---|
| GB | 2516425 B | 12/2015 |
| GB | 2505169 B | 3/2016 |
| JP | H033-3496 A | 2/1991 |
| JP | 2015-27097 A | 2/2015 |
| WO | 2013/001755 A1 | 1/2013 |
| WO | 2013/128010 A2 | 9/2013 |

OTHER PUBLICATIONS

Discrete cosine transform—Wikipedia, the free encyclopedia (accessed Jul. 10, 2016); URL: http://en.wikipedia.org/wiki/Discrete_cosine_transform.
Inverse scattering transform—Wikipedia, the free encyclopedia (accessed Jul. 10, 2016); URL: http://en.wikipedia.org/wiki/Inverse_scattering_transform.
Discrete sine transform—Wikipedia, the free encyclopedia (accessed Jul. 10, 2016); URL: http://en.wikipedia.org/wiki/Discrete_sine_transform.
Discrete Fourier Transform—Wikipedia, the free encyclopedia (accessed Jul. 10, 2016); URL: http://en.wikipedia.org/wiki/Discrete_Fourier_transform.
Fast Fourier transform—Wikipedia, the free encyclopedia (accessed Jul. 10, 2016); URL: http://en.wikipedia.org/wiki/Fast_Fourier_transform.
Wavelet—Wikipedia, the free encyclopedia (accessed Jul. 10, 2016); URL: http://en.wikipedia.org/wiki/Wavelet.
Hadamard transform—Wikipedia, the free encyclopedia (accessed Jul. 10, 2016); URL: http://en.wikipedia.org/wiki/Hadamard_transform.
JPEG—Wikipedia, the free encyclopedia (accessed Jul. 10, 2016); URL: http://en.wikipedia.org/wiki/JPEG.
H.264/MPEG-4 AVC—Wikipedia, the free encyclopedia (accessed Jul. 10, 2016); URL: http://en.wikipedia.org/wiki/H.264/MPEG-4AVC.
High Efficiency Video Coding—Wikipedia, the free encyclopedia (accessed Jul. 10, 2016); URL: http://en.wikipedia.org/wiki/High_Efficiency_Video_Coding.
MP3—Wikipedia, the free encyclopedia (accessed Jul. 10, 2016); URL: http://en.wikipedia.org/wiki/MP3.
Quantization (signal processing)—Wikipedia, the free encyclopedia (accessed Jul. 10, 2016); URL: http://en.wikipedia.org/wiki/Quantization_(signal_processing).
Rate-distortion optimization—Wikipedia, the free encyclopedia (accessed Jul. 10, 2016); URL: http://en.wikipedia.org/wiki/Rate-distortion_optimization.
Variable-length code—Wikipedia, the free encyclopedia (accessed Jul. 10, 2016); URL: http://en.wikipedia.org/wiki/Variable-length_code.
Range encoding—Wikipedia, the free encyclopedia (accessed Jul. 10, 2016); URL: http://en.wikipedia.org/wiki/Range_encoding.
Combined Search and Examination Report under Sections 17 and 18(3) dated Jan. 30, 2017.
Written Opinion of the International Preliminary Examining Authority issued in International Application No. PCT/EP2017/025215 dated Jun. 5, 2018.
Great Britain Examination Report, dated May 29, 2019, issued in corresponding Great Britain Application No. 1612365.5, 4 pages.

* cited by examiner though quality, bit target, compression level, or speed would be manually chosen, there is not typically any sufficiently refined automatic support provided for block-by-block or packet-by-packet switching between multiple coding methods, because switching between the coding methods is a complex challenge.

ENCODERS, DECODERS AND METHODS EMPLOYING QUANTIZATION

CROSS-REFERENCE TO RELATED APPLICATIONS

This application is a National Stage of PCT/EP2017/025215, filed Jul. 17, 2017, which claims priority under 35 U.S.C. § 119 to GB Application No. 1612365.5, filed Jul. 15, 2016, all of which are incorporated herein by reference in their entirety.

TECHNICAL FIELD

The present disclosure relates to encoders for encoding input data to generate corresponding encoded data. Moreover, the present disclosure concerns methods of encoding input data to generate corresponding encoded data. Furthermore, the present disclosure relates to decoders for decoding encoded data to generate corresponding decoded data. Additionally, the present disclosure concerns methods of decoding encoded data to generate corresponding decoded data. Yet additionally, the present disclosure is concerned with computer program products comprising non-transitory computer-readable storage media having computer-readable instructions stored thereon, the computer-readable instructions being executable by a computerized device comprising processing hardware to execute the aforesaid methods. Yet additionally, the present disclosure concerns codecs including at least one aforementioned encoder and at least one aforementioned decoder, for example at least one encoder and a plurality of decoders, for example in multi-casting content distribution systems.

BACKGROUND

Contemporarily, usage, storage and transfer of data are increasing rapidly. Data requires storage space, and transmission bandwidth when communicated from one location to another. When images, videos, audio, genomic data, measurement data or any other data is stored or transmitted, it is desirable to compress such data as much as possible and with as high a quality as possible so as to enable cost and energy savings, together with a good user experience, namely a high quality and a low latency.

Data compression is well known, and enables less communication network capacity and less data storage capacity to be utilized when communicating and storing given data, respectively. Data compression can be lossless, when information is not lost as a result of data compression; alternatively, data compression can be lossy, when a degree of loss of information occurs as a result of data compression.

Many transform-based encoding methods are used with contemporary image, video, and audio compression codecs. Examples of transforms that code signals in the frequency domain include, but are not limited to, Discrete Cosine Transform (DCT; see reference [1]), Inverse Scattering Transform (1ST, see reference [2]), Discrete Sine Transform (DST; see reference [3]), Discrete Fourier Transform (DFT; see reference [4]), Fast Fourier Transform (FFT, see reference [5]), Wavelet (see reference [6]) and Hadamard transform (see reference [7]). Known transform-based encoding methods are often employed to encode data to generate corresponding encoded data in contemporary lossy image and video compression standards, for example in contemporarily known JPEG (see reference [8]), H.264 (see reference [9]), and HEVC (see reference [10]. Some transform-based encoding methods are also used in a contemporary encoding standard MP3 (see reference [11]) for providing audio data compression. Moreover, the DCT-based encoding method can be used effectively, due to its "high energy compaction property" to compress data efficiently.

There are also available codecs, for example a data block encoder as described in a granted UK patent document GB2503295B and a data block decoder as described in a published UK patent document GB2505169B, which are operable to use multiple mutually different coding methods, for example, such as multilevel coding, scale coding, slide coding, line coding, extrapolation, interpolation, coding via a reference to a database, DCT and so forth, when processing mutually different data blocks or data packets.

It is found in practice that mutually different methods are better suited for mutually different kinds of data blocks or data packets. In other words, one generic DCT method of encoding data is not enough alone to compete in an optimal manner against the other aforementioned coding methods. Similarly, with other methods, it is difficult to define which kind of quantization would create an optimal compression result for a given data block or data packet being processed.

It is known that DCT and other transforms are susceptible to being used with different quantization parameters or different quantization tables for achieving different quality or bit targets, when generating encoded data from input data. For example, in encoded data produced by a given H.264 encoder, a quantization parameter is used that directly determines a quantization strength for Discrete Cosine Transform (DCT) coefficients for a given block; moreover, for example, in encoded data produced by a JPEG encoder, there is a employed a quantization table which determines a quantization strength for each individual Discrete Cosine Transform (DCT) coefficient value. However, in known H.264 and JPEG standards, it is not known to generate encoded data containing DCT-transformed blocks that have a mutually same quality parameter, yet are coded using a different quantization strength selected to be used for a coded block coded pursuant to such standards.

Furthermore, the above-mentioned earlier known approaches do not include an option of inserting selection information about different coding methods (e.g. DCTQL and DCTQH), in cases where a same given quality parameter but a different quantization strength is to be used with a base method (e.g. DCT). In fact, the above-mentioned earlier known methods do not even insert a quality parameter into the encoded data, but only the quantization strengths used for the DCT transform coefficients of the blocks.

Different quantization parameters or different quantization tables (quantizations) are also known to be used for different colour channels (for example, the luminance channel Y and the chrominance channels U & V in the YUV colour space). Moreover, it is also known that other coding methods can also be used with different quantizations.

However, there are still no known coding solutions that provide an easy and cost-efficient mechanism to switch between mutually different quantizations block-by-block or packet-by-packet during encoding and decoding processes with multiple different coding methods. It is contemporarily possible to change quantization parameters for a given frame, channel, slice or region of interest (ROI). However, there are not presently supported, in respect of accuracy or flexibility, suitable arrangements that are needed to change coding methods and quantization. Typically, only one coding method is used, and the quantization parameter is rarely changed for that coding method. Thus, conventional coding solutions deliver information only for a few changes, and are not much concerned with how this information is delivered. Therefore, such approaches are too expensive (in data overhead, for example) to deliver the information associated when there are a lot of changes (for example, for each block or packet) in the coding methods and quantization levels.

In a published PCT patent application WO 2013/128010 A2 (Leannec Fabrice Le et. al.; "Method and devices for encoding a sequence of images into a scalable video bitstream, and decoding a corresponding scalable video bitstream"), there is described an encoding method which comprises encoding a base layer and an enhancement layer, including encoding an enhancement original INTRA image using intra-frame prediction only by: obtaining a residual image as a difference between the enhancement original INTRA image and a decoded corresponding encoded base image in the base layer, the residual image comprising blocks of pixels, each having a block type; transforming pixel values for a block into a set of coefficients each having a coefficient type, said block having a given block type; determining an initial coefficient encoding merit for each coefficient type; selecting coefficients based, for each coefficient, on the corresponding initial coefficient encoding merit and on a predetermined block merit; quantizing the selected coefficients into quantized symbols; and encoding the quantized symbols.

SUMMARY

The present disclosure seeks to provide an improved method of encoding input data (D1) to generate corresponding encoded data (E2).

Moreover, the present disclosure seeks to provide an improved encoder for encoding input data (D1) to generate corresponding encoded data (E2).

Moreover, the present disclosure seeks to provide an improved method of decoding encoded data (E2) to generate corresponding decoded data (D3).

Moreover, the present disclosure seeks to provide an improved decoder for decoding encoded data (E2) to generate corresponding decoded data (D3).

A further aim of the present disclosure is to at least partially overcome at least some of the problems of the prior art, as discussed above.

In a first aspect, embodiments of the present disclosure provide a method of encoding input data (D1) to generate corresponding encoded data (E2), via an encoder, wherein the input data (D1) includes a plurality of data portions, wherein a data portion refers to a data block, characterized in that the method includes:
(a) setting one or more values of a quality parameter for the plurality of data portions in a portion-specific manner, such that a given data portion has a corresponding given value of the quality parameter;
(b) analysing the plurality of data portions and selecting at least one encoding method and at least two different quantization strengths to be employed for encoding the plurality of data portions, wherein, for a given data portion, a corresponding given encoding method and a corresponding given quantization strength are selected to be employed for encoding the given data portion, the corresponding given encoding method and the corresponding given quantization strength being selected based upon a given value of the quality parameter set for the given data portion at (a);
(c) encoding, by employing at least one encoding method and at least two different quantization strengths selected at (b), the plurality of data portions to generate corresponding encoded data portions, wherein at least two data portions from amongst the plurality of data portions are encoded by employing a same encoding method from amongst the at least one encoding method selected at (b), whilst employing different quantization strengths, for a same value of the quality parameter that has been set for the at least two data portions at (a);
(d) aggregating the encoded data portions to generate the encoded data (E2); and
(e) assembling information indicative of the at least two quantization strengths and information indicative of the one or more values of the quality parameter into the encoded data (E2).

The invention is of advantage in that there is provided a cost-efficient method of changing quantization strengths portion-by-portion, for example block-by-block or packet-by-packet, when using various encoding methods to encode the input data (D1) to generate the encoded data (E2); there is thereby potentially achieved an improved compression ratio or an improved quality when encoding data to generate corresponding encoded data.

In a second aspect, embodiments of the present disclosure provide an encoder for encoding input data (D1) to generate corresponding encoded data (E2), wherein the input data (D1) includes a plurality of data portions, wherein a data portion refers to a data block, and wherein the encoder includes a data processing arrangement for processing the input data (D1), characterized in that:
(a) the encoder is operable to set one or more values of a quality parameter for the plurality of data portions in a portion-specific manner, such that a given data portion has a corresponding given value of the quality parameter;
(b) the encoder includes an analyser that is operable to analyse the plurality of data portions and to select at least one encoding method and at least two different quantization strengths to be employed for encoding the plurality of data portions, wherein, for a given data portion, a corresponding given encoding method and a corresponding given quantization strength are selected to be employed for encoding the given data portion, the corresponding given encoding method and the corresponding given quantization strength being selected based upon a given value of the quality parameter set for the given data portion at (a);
(c) the encoder includes an encoding arrangement that is operable to encode, by employing at least one encoding method and at least two different quantization strengths selected at (b), the plurality of data portions to generate corresponding encoded data portions, wherein at least two data portions from amongst the plurality of data portions are encoded by employing a same encoding method from amongst the at least one encoding method selected at (b), whilst employing different quantization strengths, for a same value of the quality parameter that has been set for the at least two data portions at (a);
(d) the encoder includes an aggregator that is operable to aggregate the encoded data portions to generate the encoded data (E2); and
(e) the encoder is operable to assemble information indicative of the at least two quantization strengths and information indicative of the one or more values of the quality parameter into the encoded data (E2).

In a third aspect, embodiments of the present disclosure provide a method of decoding encoded data (E2) to generate corresponding decoded data (D3), via a decoder, wherein a data portion refers to a data block, characterized in that the method includes:

(a) receiving, within the encoded data (E2), information indicative of at least two quantization strengths and one or more values of a quality parameter employed with at least one encoding method during generation of a plurality of encoded data portions of the encoded data (E2), wherein during generation of at least two encoded data portions from amongst the plurality of encoded data portions, by employing at least one encoding method and at least two different quantization strengths, a same encoding method is employed with different quantization strengths for a same value of the quality parameter for the at least two encoded data portions;

(b) using the information from (a) to apply an inverse of the at least one encoding method with the at least two quantization strengths and the one or more values of the quality parameter, to corresponding encoded data portions of the encoded data (E2) in a portion-specific manner to generate corresponding decoded data portions, wherein, for a given encoded data portion, an inverse of a corresponding given encoding method with a corresponding given quantization strength and a corresponding given value of the quality parameter is applied to the given encoded data portion to generate a corresponding decoded data portion; and (c) aggregating the decoded data portions to generate the decoded data (D3).

In a fourth aspect, embodiments of the present disclosure provide a decoder for decoding encoded data (E2) to generate corresponding decoded data (D3), and wherein the decoder includes a data processing arrangement for processing the encoded data (E2), wherein a data portion refers to a data block, characterized in that the decoder includes:

(a) an information decoding arrangement that is operable to receive, within the encoded data (E2), information indicative of at least two quantization strengths and one or more values of a quality parameter employed with at least one encoding method during generation of a plurality of encoded data portions of the encoded data (E2), wherein during generation of at least two encoded data portions from amongst the plurality of encoded data portions, by employing at least one encoding method and at least two different quantization strengths, a same encoding method is employed with different quantization strengths for a same value of the quality parameter for the at least two encoded data portions;

(b) a decoding arrangement that is operable to use the information from (a) to apply an inverse of the at least one encoding method with the at least two quantization strengths and the one or more values of the quality parameter, to corresponding encoded data portions of the encoded data (E2) in a portion-specific manner to generate corresponding decoded data portions, wherein, for a given encoded data portion, an inverse of a corresponding given encoding method with a corresponding given quantization strength and a corresponding given value of the quality parameter is applied to the given encoded data portion to generate a corresponding decoded data portion; and (c) an aggregator that is operable to aggregate the decoded data portions to generate the decoded data (D3).

In a fifth aspect, embodiments of the present disclosure provide a computer program product comprising a non-transitory computer-readable storage medium having computer-readable instructions stored thereon, the computer-readable instructions being executable by a computerized device comprising processing hardware to execute a method pursuant to the aforementioned first aspect.

In a sixth aspect, embodiments of the present disclosure provide a computer program product comprising a non-transitory computer-readable storage medium having computer-readable instructions stored thereon, the computer-readable instructions being executable by a computerized device comprising processing hardware to execute a method pursuant to the aforementioned third aspect.

In a seventh aspect, embodiments of the present disclosure provide a codec including at least one encoder pursuant to the aforementioned second aspect, and at least one decoder pursuant to the aforementioned fourth aspect. For example, the codec includes at least one encoder and a plurality of corresponding decoders.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and apparatus disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
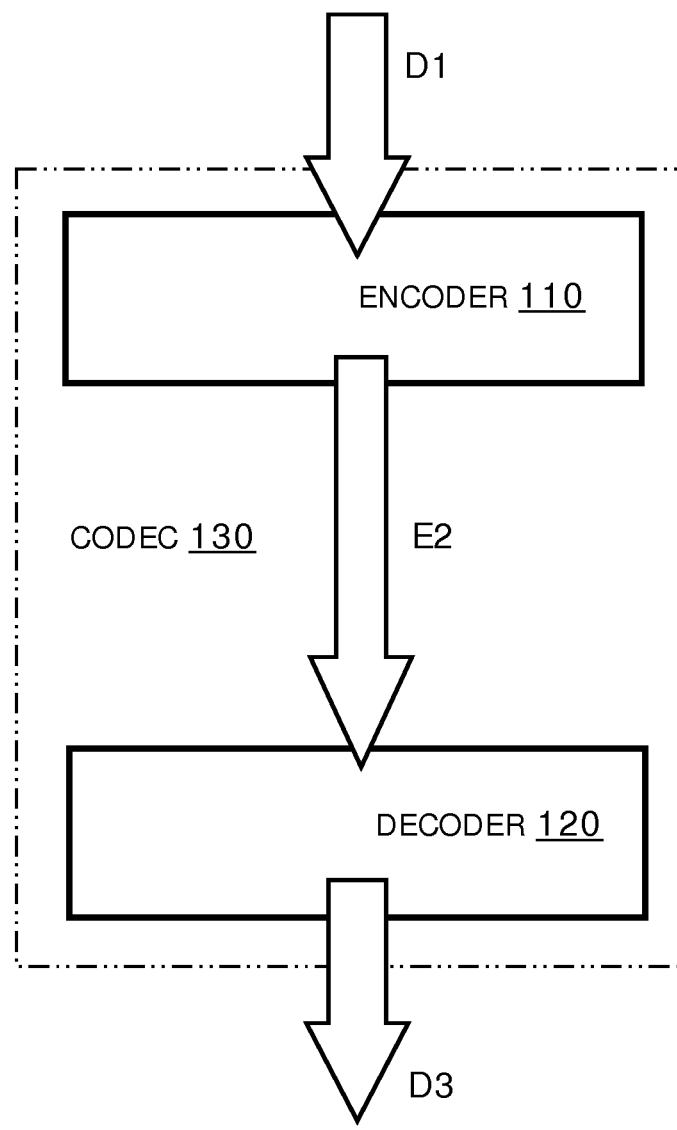
FIG. 1 is a schematic illustration of an encoder for encoding input data (D1) to generate corresponding encoded data (E2) and a decoder for decoding the encoded data (E2) to generate corresponding decoded data (D3), wherein the encoder and the decoder collectively form a codec, in accordance with an embodiment of the present disclosure.

In the accompanying diagrams, an underlined number is employed to represent an item over which the underlined number is positioned or an item to which the underlined number is adjacent.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In the following description of embodiments of the present disclosure, acronyms are used as defined in Table 1 below.

TABLE 1

| Acronyms | |
| --- | --- |
| Abbreviation | Definition |
| 1D | 1-Dimensional (for example, a signal, an audio signal, a DNA sequence, or a data packet) |
| 2D | 2-Dimensional (for example, an image) |
| 3D | 3-Dimensional (for example, a 3D image) |
| DCT | Discrete Cosine Transform |
| DFT | Discrete Fourier Transform |
| DST | Discrete Sine Transform |
| H.264 | A video codec standard |
| HEVC | A video codec standard |
| ND | Arbitrary number of dimensions |

Acronyms in Table 1 are further elucidated at the Internet web-site, "Wikipedia".

In a first aspect, embodiments of the present disclosure provide a method of encoding input data (D1) to generate corresponding encoded data (E2), via an encoder, wherein the input data (D1) includes a plurality of data portions, wherein a data portion refers to a data block, characterized in that the method includes:

(a) setting one or more values of a quality parameter for the plurality of data portions in a portion-specific manner, such that a given data portion has a corresponding given value of the quality parameter;

(b) analysing the plurality of data portions and selecting at least one encoding method and at least two different quantization strengths to be employed for encoding the plurality of data portions, wherein, for a given data portion, a corresponding given encoding method and a corresponding given quantization strength are selected to be employed for encoding the given data portion, the corresponding given encoding method and the corresponding given quantization strength being selected based upon a given value of the quality parameter set for the given data portion at (a);

(c) encoding, by employing at least one encoding method and at least two different quantization strengths selected at (b), the plurality of data portions to generate corresponding encoded data portions, wherein at least two data portions from amongst the plurality of data portions are encoded by employing a same encoding method from amongst the at least one encoding method selected at (b), whilst employing different quantization strengths, for a same value of the quality parameter that has been set for the at least two data portions at (a);

(d) aggregating the encoded data portions to generate the encoded data (E2); and (e) assembling information indicative of the at least two quantization strengths and information indicative of the one or more values of the quality parameter into the encoded data (E2).

It will be appreciated that it is sufficient for the method pursuant to embodiments of the present disclosure that there is only one encoding method available, in which case the one encoding method is applied to the data portions of the input data (D1) with different quantization strengths (for example, mutually different quantization strengths, namely using a variety of mutually different quantization strengths). In other words, the at least one encoding method could be predetermined, and therefore, is known beforehand to a given encoder and a corresponding given decoder.

Alternatively, optionally, there are a plurality of encoding methods available. Optionally, in such a case, the at least one encoding method to be employed for encoding the plurality of data portions is selected from amongst the plurality of encoding methods. Optionally, in such a case, the method further includes assembling information indicative of the at least one encoding method into the encoded data (E2).

Optionally, in some cases, the at least one encoding method includes at least two encoding methods to be employed for encoding the plurality of data portions. Optionally, in such a case, the method further includes assembling information indicative of the at least two encoding methods into the encoded data (E2).

It will be appreciated that the plurality of encoding methods could include one or more transform-based encoding methods. Examples of such transform-based encoding methods include, but are not limited to, DCT, DFT, DST, Line, Scale, Slide, Wavelet, and Hadamard transform. "DCT" refers to "Discrete Cosine Transform" (see reference [1]). "DFT" refers to "Discrete Fourier Transform" (see reference [4]). "DST" refers to "Discrete Sine Transform" (see reference [3]). "Line" refers to extrapolation methods, for example, such an extrapolation method described in a granted UK patent document GB2516425B. "Scale" and "Slide" refer to interpolation methods, for example, such as an interpolation method described in a granted UK patent document GB2516426B. "Wavelet" refers to wavelet transform (see reference [6]). For "Hadamard transform", see reference [7]. These transform-based encoding methods, namely DCT, DFT, DST, Line, Scale, Slide, Wavelet, and Hadamard transform are well known to a person of ordinary technical skill in the art, who would have knowledge about such topics from educational data sources such as Wikipedia and also from studying published patent literature.

Throughout the present disclosure, the term "data portion" generally refers to a portion of data, for example, such as a data block, a group of data blocks, a data section, a data packet, and a group of data packets. Optionally, in this regard, the plurality of data portions of the input data (D1) include at least one of:

(a) data blocks or data packets already present in the input data (D1);

(b) data blocks or data packets derived by combining individual data values present in the input data (D1) or by combining the data blocks or data packets already present in the input data (D1); and/or (c) data blocks or data packets derived by splitting the input data (D1) or by splitting the data blocks or data packets already present in the input data (D1)

Hereinabove, "at least one of" allows for options (a), (b) and (c) being used singularly, or in various combinations, for example (a) and (b), (a) and (c), (b) and (c), (a) and (b) and (c), and so forth.

Notably, the input data (D1) does not often arrive in a format that data blocks or data packets already present in the input data (D1) are known a priori, even though the input data (D1) may of course be received in such a format.

Moreover, optionally, the method further includes selecting at least two quantization methods to be employed for encoding the plurality of data portions, wherein at least two data portions from amongst the plurality of data portions are encoded by employing a same encoding method, whilst employing different quantization strengths and different quantization methods for a same value of the quality parameter that has been set for the at least two data portions at (a).

Throughout the present disclosure, the term "quantization strength" generally refers to a parameter that defines an extent to which quantization has been performed, namely how many quantization levels have been employed, while the term "quantization method" generally refers to a quantization method employed for achieving a particular quantization strength selected for a given data portion. Pursuant to embodiments of the present disclosure, the quantization strength can vary for at least two data portions of the input data (D1), even though a value of a quality parameter is the same for the at least two data portions.

The term "quantization" generally refers to a measure of resolution, whether spatial quantization or data value quantization. Reference [12] defines "quantization" in mathematics and digital signal processing as "the process of mapping a large set of input values to a (countable) smaller set". In the aforementioned method pursuant to embodiments of the present disclosure, quantization is used to represent values with fewer bits than they originally had, yet not causing too large errors. In other words, the aforementioned method employs re-quantization, for example, to reduce the amount of quantization levels in relation to the original values, which might have been produced by an Analogue-to-Digital converter from a continuous signal or which might have been digital to begin with. When the amount of quantization levels is reduced, the quantization strength is increased. For example, image colour and alpha values are usually represented with eight-bit values (namely, bytes), and audio signals are usually represented with, for example, 16-bit or 24-bit discrete digital values, even though audio signals were originally analogue, and image colours may have had a larger bit depth originally. In the method pursuant to embodiments of the present disclosure, such signals are received as the input data (D1) and then the content of the input data (D1) is adaptively re-quantized according to values of the quality parameter and the properties of the content, by selecting optimal quantization strengths and optionally, quantization methods from amongst a plurality of quantization strengths and optionally, a plurality of quantization methods.

Optionally, the method includes using at least one signal processing algorithm to reduce errors caused by quantization in decoded data (D3) that is regenerated from subsequent decoding of the encoded data (E2). As an example, the at least one signal processing algorithm can be used to smoothen out sharp edges that can be formed in a decoded image due to quantization. Optionally, the at least one signal processing algorithm is implemented by way of a deblocking filter. Such filters can be either linear or non-linear.

Optionally, the analysis at (b) involves determining one or more of: data type, data structure, data variation, data size of the data portions of the input data (D1).

Notably, the encoding at (c) includes employing a same encoding method to encode at least two data portions of the input data (D1), whilst changing quantization strengths portion-by-portion. In other words, the at least two data portions of the input data (D1) are encoded with a same encoding method, but with at least two (mutually) different quantization strengths for a same value of the quality parameter. Optionally, more than two (mutually) different quantization strengths are employed.

It will be appreciated that as there are a plurality of data portions, there could be a plurality of encoding methods (although employing merely a single encoding method is claimed herein, for example), and a plurality of quantization strengths used for encoding the plurality of data portions. However, the at least one encoding method and the at least two quantization strengths to be employed are selected in a portion-specific manner, such that for a given data portion, only one encoding method and one quantization strength is selected. In other words, during encoding, a given data portion is encoded by applying one encoding method and one quantization strength, namely its corresponding encoding method and quantization strength.

Pursuant to embodiments of the present disclosure, the one or more values of the quality parameter are set for the plurality of data portions in a portion-specific manner. In other words, each data portion has its corresponding value of the quality parameter. It will be appreciated that some of the plurality of data portions could have a same value of the quality parameter.

It will also be appreciated that different values of the quality parameter may be desired for different data portions of the input data (D1); however, a given data portion has only one value of the quality parameter associated therewith. As an example, a Region-Of-Interest (ROI) in an image can be coded with better quality than a rest of the image. In such a case, different vales of the quality parameter are set for the ROI in the image in comparison to the rest of the image, wherein only one value of the quality parameter is set for the ROI in the image.

The method pursuant to embodiments of the present disclosure is capable of enabling better data compression ratio or better data quality to be achieved for all types of data by using multiple differently-quantized alternatives for the encoding methods, in comparison to conventionally known approaches to encode data. Conventionally, only one encoding method is used, and a quantization parameter is rarely changed for a given image or slice; thus, conventional coding methods include delivering information only for a few changes, and are not much concerned with how this information is delivered. It is to be appreciated that "quantization parameter" is not the same as "quality parameter", as quantization can influence quality in different ways, depending upon a type of data being encoded, mutatis mutandis decoded. Instead, in the method pursuant to embodiments of the present disclosure, a lot of information is required to be delivered from an encoder to a corresponding decoder, namely the information indicative of the at least two quantization strengths that have been selected portion-by-portion (for example, block-by-block or packet-by-packet), the information indicative of the one or more values of the quality parameter that have been set portion-by-portion (for example, block-by-block or packet-by-packet), optionally, the information indicative of the at least one encoding method (for example, at least two encoding methods), and optionally, the information indicative of the at least two quantization methods that have been selected portion-by-portion (for example, block-by-block or packet-by-packet). Moreover, the aforementioned method can be used in combination with multiple mutually different encoding methods and standards. As an example, the aforementioned method can be used with a data block encoder as described in a granted UK patent document GB2503295B, to achieve a higher data quality with a mutually similar data compression ratio or a higher data compression ratio with a mutually similar data quality.

Moreover, the aforementioned method is suitable for use with various different types of data that can have any number of dimensions, for example 1D, 2D, 3D, and ND, wherein N is a positive integer. Optionally, the input data (D1) includes one-dimensional data. Alternatively, optionally, the input data (D1) includes multi-dimensional data. Yet alternatively, optionally, the input data (D1) includes a combination of one-dimensional data and multi-dimensional data, for example as a function of changing content present in various portions of the input data (D1). In other words, dimensionality of the input data (D1) is potentially changeable within mutually different portions of the input data (D1).

Optionally, the input data (D1) includes at least one of: image data, video data, audio data, biometric data, genomic data, medical measurement data, sensor data, surveillance data. As an example, surveillance data can include a combination of video clips, data files recording temporal opening and closing of security doors, audio clips, and surveillance officer verification logins when completing manual surveillance tasks. More optionally, the input data (D1) includes a plurality of mutually different types of data. As an example, the input data (D1) may include a mixture of biometric data and video data, as in a video of a medical operation being performed. For example, a video film of a medical operation taking place may require measurement data to be provided in a lossless manner, whereas video clips of actual operating procedures for general guidance can be provided in a lossy encoding manner.

Moreover, according to an embodiment of the present disclosure, the at least two quantization strengths are selected in a dynamic manner, based upon one or more characteristics of the plurality of data portions of the input data (D1), for example in real-time data streaming systems. Optionally, in this regard, the one or more characteristics of the plurality of data portions include at least one of: original resolution of data content of the data portions, and/or original quality of data content. Such one or more characteristics can relate to an image resolution, a colour or black/white format of images, a complexity of spatial information in images, a range of spatial information present in images, and so forth.

The usage, quality or compression ratio of the encoding methods is considerably improved when the quantization strengths and optionally, quantization methods are selected portion-by-portion.

Optionally, the method includes employing Rate Distortion (RD) optimization (see reference [13]) for determining whether or not a given encoding method, a given quantization strength and optionally, a given quantization method is suitable for encoding a given data portion of the input data (D1) to achieve a given quality. Optionally, in this regard, the RD optimization is employed to reduce, for example to minimize, an RD value, which is calculated as a distortion caused by the given encoding method, the given quantization strength and optionally, the given quantization method, added to "lambda" multiplied by a number of bits used for the given encoding method, the given quantization strength and optionally, the given quantization method, wherein "lambda" is a Lagrangian multiplier. More optionally, the distortion is calculated as a squared error between decoded and original data portion.

Pursuant to embodiments of the present disclosure, the quantization strength can vary for at least two data portions of the input data (D1), even though a value of a quality parameter is the same for the at least two of the data portions.

Throughout the present disclosure, the term "quality parameter" generally refers to a parameter that defines how compromises are made between a quality and a compression ratio, namely how optimizations are made between the quality and the compression ratio. As an example, a given value of a quality parameter indicates a quality level requirement, based on which a value of the Lagrangian multiplier is computed or set during the RD optimization process. Notably, in conventional coding methods, the quantization strength is directly related to a quality level requirement, namely changes only when the quality level requirement changes. It is to be noted here that the quality parameter is not bound directly to the quality, but is concerned with an optimization between reducing the size of the encoded data (E2), while increasing the quality of reconstructed data, namely data reconstructed from subsequent decoding of the encoded data (E2).

Optionally, the quantization strength is adjusted adaptively to match a given value of the quality parameter. Optionally, a high value of the quality parameter requires that a low quantization strength is used, which then produces high quality at the corresponding decoder. Optionally, in such a case, a low value of the quality parameter corresponds to a high quantization strength, a medium value of the quality parameter corresponds to a medium quantization strength, and a high value of the quality parameter corresponds to a low quantization strength. As an example, if the value of the quality parameter varies in a range of 1 to 100, then a low quantization strength corresponds to a high value of the quality parameter, for example 100 or close to 100, a high quantization strength corresponds to a low value of the quality parameter, for example one or close to one, and a medium quantization strength corresponds to a medium value of the quality parameter, for example 50 or close to 50.

As mentioned earlier, pursuant to embodiments of the present disclosure, the quality parameter controls the optimization between the quality and the compression ratio; in other words, selection of a quantization strength with an associated encoding method for a given data portion is performed based upon a given value of the quality parameter set for the given data portion. It will be appreciated that sometimes it is also possible to achieve high quality even in cases when high quantization strength is used. When such a case is detected, considerable compression benefits are gained.

Optionally, the one or more values of the quality parameter includes a default value of the quality parameter; low, medium and high values of the quality parameter are then determined automatically according to the default value of the quality parameter.

It will be appreciated that as the one or more values of the quality parameter employed are also signaled from the encoder to the decoder, the decoder is operable to perform automatic adaptations and adjustments in the quantization strengths employed, even without exact information about the used quantization strength for the data portions each time.

It will be appreciated here that as the quality parameter and the quantization strength do not depend directly on each other, it is sometimes possible to use a large quantization strength with good quality, if such large quantization strength still produces good quality, when values of the input data (D1) are suitable.

Alternatively, optionally, the quantization strength is adjusted entirely absolutely, without considering the value of the quality parameter at all.

Pursuant to embodiments of the present disclosure, the quantization strength is not determined directly from a given value of the quality parameter. Notably, the quality parameter has an effect on the value of the Lagrangian multiplier. In the method pursuant to embodiments of the present disclosure, the value of the Lagrangian multiplier is defined for a given value of the quality parameter in a manner that a larger value of the quality parameter results in a smaller value of the Lagrangian multiplier. As a result, the quality and the compression ratio to be achieved are optimized as much as possible for a given type of data. In other words, larger is the value of the quality parameter, larger is the amount of the encoded data (E2) generated and better is the quality in corresponding decoded data (D3), namely data reconstructed from subsequent decoding of the encoded data (E2). Correspondingly, smaller is the value of the quality parameter, smaller is the amount of the encoded data (E2) generated and worse (namely, greater in error) is the quality in the corresponding decoded data (D3).

Thus, the method pursuant to embodiments of the present disclosure is operable to select the best encoding method and optionally, the best quantization method for each data portion, regardless of whether the quantization strength is adjusted adaptively or absolutely with respect to the quality parameter. In other words, the method pursuant to embodiments of the present disclosure is operable to adjust the quality parameter and the quantization strength separately, regardless of whether the quantization strength is adjusted adaptively or absolutely with respect to the quality parameter. As a result, the method pursuant to embodiments of the present disclosure is operable to optimize compression of data and subsequent decoding of encoded data (E2) with a given value of the quality parameter in a manner that an encoding method, a quantization strength and optionally, a quantization method that are best suited to a given data portion are used.

It is to be noted here that it is advantageous to use several mutually different coding methods so as to reduce, for example to minimize, the size of the encoded data (E2) and to increase, for example to maximize, the quality of the reconstructed data. This is potentially accomplished in an optimal manner, as the employed RD optimization makes it possible to select an encoding method, a quantization strength and optionally, a quantization method that is best suited for a given data portion, without having to resort to a large number of iterations or to defined tables that include a large number of sub-optimal values and definitions.

Optionally, in the method, an iterative approach is employed to determine an optimal combination of encoding methods, quantization strengths and optionally, quantization methods to be employed, to achieve an overall best or sufficiently good encoding of the input data (D1), when generating the encoded data (E2). Optionally, the iterations are continued until a required degree of data compression and/or data quality is achieved in the encoded data (E2), relative to the input data (D1).

It will be appreciated that the selection of best or sufficiently good combinations of encoding methods, quantization strengths and optionally, quantization methods can be made in various different ways. As an example, the brute-force method can be utilized to test all possible alternatives. As another example, multiple different alternative combinations can be made available, and the best or sufficiently good combinations can be selected from amongst these multiple different alternative combinations, thereby not having to test all possible combinations.

Moreover, according to an embodiment of the present disclosure, the information indicative of the at least two quantization strengths and the information indicative of the one or more values of the quality parameter are assembled in a form of one or more data streams into the encoded data (E2). Optionally, in this regard, the one or more data streams are included in a header within the encoded data (E2). It will be appreciated that delivering within the header is only one example way of delivering the one or more data streams. At times, it is difficult to determine which bytes belong to the header and which bytes belong to the encoded data portions, especially when the encoded data (E2) is delivered by way of a single data stream in which the encoded data portions are combined. In such a case, it is potentially beneficial to deliver the information indicative of the at least two quantization strengths and the information indicative of the one or more values of the quality parameter in one or more separate data streams.

According to another embodiment of the present disclosure, the method includes delivering, from the encoder to a corresponding decoder, the one or more data streams independently from the encoded data (E2).

It will be appreciated here that the term "data streams" does not indicate that different data streams would be communicated separately via different communication channels. Throughout the present disclosure, the term "data streams" generally refers to sections of data that are kept separate from one another. In other words, the data streams are optionally inserted to a same file one after the other, or optionally transmitted via a same communication channel one after the other. However, it is also possible to store or transmit separate data streams separately.

According to an embodiment of the present disclosure, for a given data portion, information indicative of a corresponding given encoding method, information indicative of a corresponding given quantization strength, and/or information indicative of a corresponding given value of the quality parameter are assembled separately, namely as separate pieces of information for the given data portion. Optionally, in this regard, the method includes assembling the information indicative of the at least one encoding method, the information indicative of the at least two quantization strengths, and the information indicative of the one or more values of the quality parameter into separate data streams. These "mutually" separate data streams can be either included into the encoded data (E2) or delivered independently from the encoded data (E2).

According to another embodiment of the present disclosure, for a given data portion, at least two of: information indicative of a corresponding given encoding method, information indicative of a corresponding given quantization strength, and/or information indicative of a corresponding given value of the quality parameter are assembled together, namely as a single piece of information for the given data portion. Optionally, in this regard, the method includes assembling at least two of: the information indicative of the at least one encoding method, the information indicative of the at least two quantization strengths, and/or the information indicative of the one or more values of the quality parameter into a single data stream.

This single data stream can be either included into the encoded data (E2) or delivered independently from the encoded data (E2).

Optionally, information indicative of an encoding method employed for a given data portion and information indicative of a quantization strength employed for the given data portion are combined into a single piece of information for the given data portion. Optionally, such a single piece of information is implemented by way of a selection index that denotes the selected encoding method and the selected quantization strength employed for the given data portion. In such a case, selection indices associated with the plurality of data portions are then assembled into a single data stream, which is optionally inserted into a single data file.

Optionally, the information indicative of the at least one encoding method, the information indicative of the at least two quantization strengths, and the information indicative of the one or more values of the quality parameter are delivered from a database or a data server.

In this manner, the information indicative of the at least one encoding method, the information indicative of the at least two quantization strengths, and the information indicative of the one or more values of the quality parameter are assembled and delivered to a given decoder as efficiently as possible. This enables the given decoder to perform proper decoding of the encoded data (E2) unambiguously.

Optionally, the at least one selected encoding method, the selected quantization strengths and optionally, the selected quantization methods employed for the plurality of data portions of the input data (D1) are denoted using selection indices. As an example, mutually different DCT-based encoding methods and their corresponding quantization strengths and optionally, quantization methods can be represented by selection indices "DCTQ1", "DCTQ2", "DCTQ3" and so on, wherein mutually different quantization methods and/or mutually different quantization strengths for those encoding methods can then be represented by selection indices "Q1", "Q2", "Q3" and so on. In such a case, the selection index "DCTQ1" denotes that a quantization method and a quantization strength denoted by the selection index "Q1" is used, the selection index "DCTQ2" denotes that a quantization method and a quantization strength denoted by the selection index "Q2" is used, and so on.

It will be appreciated that despite different names being employed in the foregoing, for example, for the DCT encoding method, a situation can arise that they is a same encoding method (namely, DCT), but is just employing different quantization strengths and optionally also different quantization methods.

Moreover, optionally, the naming of the encoding methods and their corresponding quantization strengths and optionally, quantization methods is absolute, namely is not related to the quality parameter. As an example, the selection index "DCTQD1" denotes that the DCT-based encoding method divides data values by one, namely, the DCT-based encoding method does not quantize at all; the selection index "DCTQD2" denotes that the DCT-based encoding method divides the data values by two; likewise, the selection index "DCTQD4" denotes that the DCT-based encoding method divides the data values by four.

Alternatively, optionally, the naming of the encoding methods and their corresponding quantization strengths and optionally, quantization methods is relative to the quality parameter. As an example, selection indices "DCTQL", "DCTQM" and "DCTQH" can be used, wherein the selection index "DCTQM" denotes that the DCT-based encoding method quantizes substantially as indicated by a quality parameter that was given to the input data (D1), for example using a default quantization strength according to the quality parameter, whereas the selection index "DCTQH" denotes that the DCT-based encoding method quantizes using a quantization strength that is higher than the default quantization strength, namely with a quality that is lower than that indicated by the quality parameter, and the selection index "DCTQL" denotes that the DCT-based encoding method quantizes using a quantization strength that is lower than the default quantization strength, namely with a quality that is higher than that indicated by the quality parameter. In such a case, the default quantization strength could be defined for a given value of the quality parameter, and other quantization strengths could be defined relative to the default quantization strength. Decremental and/or incremental adjustment of the quantization strength employed when decoding a data stream of the encoded data (E2) in a decoder is employed, in response to the information indicative of the encoding methods, the quantization strengths, the one or more values of the quality parameter, and optionally, the quantization methods employed, which information is included within the encoded data (E2) and/or delivered independently from the encoded data (E2).

As another example, if a desired value of the quality parameter were 50 in a range of 1 to 100, then the selection index "DCTQM" could indicate quantizing, for example, by 8, the selection index "DCTQL" could indicate quantizing, for example, by 5, and the selection index "DCTQH" could indicate quantizing, for example, by 12.

More optionally, the quantization strength is increased (for example, as denoted by "QH") or decreased (for example, as denoted by "QL") by one or more steps at a time in accordance with a given definition of a selected encoding method. As an example, if a default quantization strength used with DCT were 10, then the selection index "DCTQM" could indicate quantizing by the default quantization value, namely 10, the selection index "DCTQH1" could indicate quantizing, for example, by 11, the selection index "DCTQH2" could indicate quantizing, for example, by 13, the selection index "DCTQL1" could indicate quantizing, for example, by 9, and the selection index "DCTQL2" could indicate quantizing, for example, by 8.

Thus, pursuant to embodiments of the present disclosure, the information indicative of the selected encoding method(s) and the selected quantization strengths is delivered from the encoder to the decoder using at least two selection indices, for example a plurality of such indices of the selected encoding method(s) and the selected quantization strengths, or rather using their unique identification numbers.

Notably, pursuant to embodiments of the present disclosure, various mutually different encoding methods, such as DCT, DST, Line, Scale, Slide and so forth, can be used, and these encoding methods can have mutually different alternative options available for executing the quantization, namely mutually different quantization strengths and optionally, mutually different quantization methods. In this regard, the mutually different encoding methods and their mutually different alternative quantizations can be signalled using suitable selection indices and their unique identification numbers.

As an example, the selection indices and their identification numbers are as follows:

an identification number "0" for a selection index "Unchanged";
an identification number "1" for a selection index "DC8";
an identification number "2" for a selection index "DC7";
an identification number "3" for a selection index "DC6";
an identification number "4" for a selection index "LineH8";
an identification number "5" for a selection index "LineH7";
an identification number "6" for a selection index "LineV8";
an identification number "7" for a selection index "LineV7";
an identification number "8" for a selection index "DCTL";
an identification number "9" for a selection index "DCTM";
an identification number "10" for a selection index "DCTH1";
an identification number "11" for a selection index "DCTH2";
and so on.

Hereinabove, the selection index "DC8" could indicate that for the DC encoding method, the data values after quantization are expressed with 8 bits, and correspondingly, the selection index "DC7" could indicate that the data values after quantization are expressed with 7 bits.

It should be appreciated that in case a bit depth of the original data values, namely before quantization, is "8", then instead of the quantization method indicated by the selection index "DC8", a quantization method indicated by a selection index "DCQD1" can be used, so as to achieve a same end result. Herein, the selection index "DCQD1" indicates that the original data values are divided by one. Correspondingly, the quantization method indicated by the selection index "DC7" can be replaced by a quantization method indicated by a selection index "DCQD2", which indicates that the original data values are divided by two. Likewise, the quantization method indicated by the selection index "DC6" could be replaced by a quantization method indicated by a selection index "DCQD4", and so forth. This also applies to the quantization methods indicated by the selection indices "LineH8", "LineH7", "LineV8" and "LineV7".

Moreover, it is possible to select a quantization method that adjusts adaptively according to a given quality parameter; in such a case, the quality parameter directly affects the magnitude of the quantization, without any separate signalling of the quantization strength. If, in such a case, it is desired to adjust the quantization strength, then this can be accomplished by using quantization methods indicated by a selection index "QH" that quantize more, thereby producing a worse quality, or quantization methods indicated by a selection index "QL" that quantize less, thereby producing a better quality.

Notably, there are many mutually different quantization methods and quantization strengths available. The selected quantization strengths and optionally, quantization methods can be defined using a division value or a number of bits in the data values after quantization, namely the bit depth of the data values after quantization.

Continuing from the above example, in a case where the information indicative of the selected encoding methods is assembled and delivered separately from the information indicative of the selected quantization strengths, the selection indices and their identification numbers are optionally as follows:
an identification number "0" for a selection index "Unchanged";
an identification number "1" for a selection index "DC";
an identification number "2" for a selection index "LineH";
an identification number "3" for a selection index "LineV";
an identification number "4" for a selection index "DCT";
and so on.

Moreover, the information indicative of the selected quantization methods and the information indicative of the selected quantization strengths are optionally assembled and delivered in a separate data stream for each selected encoding method, or in at least one combined data stream for at least one selected encoding method. Such a combined data stream is optionally employed to signal quantization values either as absolute values, for example, such as 8, 7, 6 and so on, or as relative values, for example, such as 0, −1, +1, −2 and so on.

It will be appreciated that it is also possible to use more advanced quantization schemes by using, for example, equations or Look-Up Tables (LUTs). Irrespective of the quantization schemes used, the definition and delivery of the selected quantization strengths and optionally, the selected quantization methods should be unique so as to enable the decoder unambiguously to perform proper de-quantization for the data values.

Moreover, optionally, the same encoding methods and quantization strengths are used for mutually differently-sized data portions. Alternatively, optionally, mutually different encoding methods and/or mutually different quantization strengths are used for data portions of mutually different sizes. In other words, data portions of a same size can have their own selection of mutually different alternatives available for encoding methods and quantization strengths.

It will be appreciated that when given input data (D1) is desired to be compressed, then it is potentially beneficial to divide the given input data (D1) into as large data portions as possible, to use as simple encoding methods as possible, and to quantize as much as possible, while taking into account errors encountered in reconstruction during subsequent decoding, namely the quality of reconstruction. In other words, it is not beneficial to quantize a small amount of data produced by a simple encoding method to a large extent, as savings with respect to bits to be delivered are often small, but errors encountered in reconstruction are large. Conversely, quantizing data produced by a comparatively more complex encoding method a bit more often reduces data bits to be delivered without compromising too much on the quality of reconstruction. Thus, the sizes of the data portions and encoding methods to be employed are optionally determined based on the data content of the input data (D1), whilst aiming to have as large data portions as possible and as simple encoding methods as possible. Optionally, the term "data content" relates to, for example, image information, image colour, image contrast, image spatial information density, temporal variations occurring in a sequence of video images, for example fast-moving video scenes. Optionally, the term data content is defined in metadata that accompanies video data.

Furthermore, according to an embodiment of the present disclosure, the encoded data portions are aggregated into a plurality of data streams included within the encoded data (E2), based upon different encoding methods and/or different quantization strengths employed. For example, "different encoding methods" should be construed to mean "mutually different encoding methods", namely using a variety of different encoding methods, and "different quantization strengths" is to be construed to mean "mutually different quantization strengths", namely using a variety of different quantization strengths. Optionally, in this regard, encoded data portions generated by employing mutually different encoding methods are aggregated into mutually different data streams, due to mutually different properties of possible data values, or data values generated by aforesaid encoding methods.

According to another embodiment of the present disclosure, the encoded data portions are aggregated into a single data stream, for example for purposes of wireless broadcast, optical fibre data broadcast, and similar. Optionally, in a multicasting system, the encoded data streams can be provided separately, for example to mutually different servers in a data communication network. Such an arrangement is of value when, for example, distributing a new block-buster film for public viewing wherein data associated with some of the plurality of data streams are loaded in various servers in various parts of the World beforehand, and viewing, namely "release" of the block-buster film occurs when a final data stream of the plurality of data streams is made available that allows decoding of the encoded data at user devices. Such operation is capable of reducing peak data-flows within the data communication network. Moreover, various versions of the final data stream can be provided that allows viewing of the block-buster film at different resolutions, depending upon an amount of money that users of the user devices are prepared to pay.

Optionally, at least two of the plurality of data streams are combined together to reduce, for example to minimize, a number of data streams included within the encoded data (E2).

For illustration purposes only, there will now be considered an example of how the aforementioned aggregation into mutually different data streams can be performed. In the illustrated example, one or more data portions of input data (D1) are encoded using a first encoding method "DCTQD2" with a first quantization strength "QD2" that divides transformed values by two, while one or more other data portions of the input data (D1) are encoded using a second encoding method "DCTQD4" with a second quantization strength "QD4" that divides transformed values by four. In such a case, it is beneficial to provide DC coefficients generated from the first and second encoding methods "DCTQD2" and "DCTQD4" into mutually separate data streams. In other words, the DC coefficients generated from the first encoding method "DCTQD2", namely values ranging from 0 to 1024, are provided in a first data stream, while the DC coefficients generated from the second encoding method "DCTQD4", namely values ranging from 0 to 512, are provided in a second data stream.

However, it will be appreciated that it is not beneficial to provide, for example, sign bits of AC coefficients generated from the first and second encoding methods "DCTQD2" and "DCTQD4" into separate streams, because the quantization strengths "QD2" and "QD4" do not change their property. Therefore, the sign bits of the AC coefficients are provided in a single data stream, which is possibly compressed, more efficiently than two separate data streams of the sign bits.

It will be appreciated that the terms "first", "second", and the like, herein do not denote any order, quantity, or importance, but rather are used to distinguish one element from another.

In overview, pursuant to embodiments of the present disclosure, when there are many, for example ten, encoding methods available, for example as in a block encoder, then there is only a modest increase in encoding complexity required for accommodating switching between quantization methods and quantization strengths in combination with switching between the many encoding methods. Thus, if a few additional encoding methods are included as new alternatives by using a similar encoding method with mutually different quantization methods and mutually different quantization strengths, there is thereby provided an advantageous opportunity to switch easily between mutually different quantization methods and mutually different quantization strengths for mutually different data portions.

In a second aspect, embodiments of the present disclosure provide an encoder for encoding input data (D1) to generate corresponding encoded data (E2), wherein the input data (D1) includes a plurality of data portions, wherein a data portion refers to a data block, and wherein the encoder includes a data processing arrangement for processing the input data (D1), characterized in that:

(a) the encoder is operable to set one or more values of a quality parameter for the plurality of data portions in a portion-specific manner, such that a given data portion has a corresponding given value of the quality parameter;

(b) the encoder includes an analyser that is operable to analyse the plurality of data portions and to select at least one encoding method and at least two different quantization strengths to be employed for encoding the plurality of data portions, wherein, for a given data portion, a corresponding given encoding method and a corresponding given quantization strength are selected to be employed for encoding the given data portion, the corresponding given encoding method and the corresponding given quantization strength being selected based upon a given value of the quality parameter set for the given data portion at (a);

(c) the encoder includes an encoding arrangement that is operable to encode, by employing at least one encoding method and at least two different quantization strengths selected at (b), the plurality of data portions to generate corresponding encoded data portions, wherein at least two data portions from amongst the plurality of data portions are encoded by employing a same encoding method from amongst the at least one encoding method selected at (b), whilst employing different quantization strengths, for a same value of the quality parameter that has been set for the at least two data portions at (a);

(d) the encoder includes an aggregator that is operable to aggregate the encoded data portions to generate the encoded data (E2); and (e) the encoder is operable to assemble information indicative of the at least two quantization strengths and information indicative of the one or more values of the quality parameter into the encoded data (E2).

The encoder pursuant to embodiments of the present disclosure is capable of enabling better data compression ratio or better data quality to be achieved for all types of data by using multiple differently-quantized alternatives for the encoding methods, in comparison to conventionally known encoders.

Optionally, the input data (D1) includes at least one of: image data, video data, audio data, biometric data, genomic data, medical measurement data, sensor data, surveillance data, multi-dimensional data.

Optionally, the analyser is operable to select the at least two quantization strengths in a dynamic manner, based upon one or more characteristics of the plurality of data portions of the input data (D1), as described earlier.

Moreover, optionally, the analyser is operable to select the at least one encoding method to be employed for encoding the plurality of data portions from amongst a plurality of encoding methods, wherein the encoder is operable to assemble information indicative of the at least one encoding method into the encoded data (E2).

Optionally, the at least one encoding method includes at least two encoding methods to be employed for encoding the plurality of data portions, wherein the encoder is operable to assemble information indicative of the at least two encoding methods into the encoded data (E2).

Furthermore, according to an embodiment of the present disclosure, for a given data portion, at least two of: information indicative of a corresponding given encoding method, information indicative of a corresponding given quantization strength, and/or information indicative of a corresponding given value of the quality parameter are assembled together, namely as a single piece of information for the given data portion. Optionally, in this regard, the encoder is operable to assemble at least two of: the information indicative of the at least one encoding method, the information indicative of the at least two quantization strengths, and/or the information indicative of the one or more values of the quality parameter into a single data stream.

According to another embodiment of the present disclosure, for a given data portion, information indicative of a corresponding given encoding method, information indicative of a corresponding given quantization strength, and/or information indicative of a corresponding given value of the quality parameter are assembled separately, namely as separate pieces of information for the given data portion. Optionally, in this regard, the encoder is operable to assemble the information indicative of the at least one encoding method, the information indicative of the at least two quantization strengths, and the information indicative of the one or more values of the quality parameter into separate data streams.

Moreover, optionally, the encoder is operable to select at least two quantization methods to be employed for encoding the plurality of data portions, wherein at least two data portions from amongst the plurality of data portions are encoded by employing a same encoding method, whilst employing different quantization strengths and different quantization methods for a same value of the quality parameter that has been set for the at least two data portions at (a).

Furthermore, optionally, the aggregator is operable to aggregate the encoded data portions into a plurality of data streams included within the encoded data (E2), based upon different encoding methods and/or different quantization strengths employed.

Optionally, the information indicative of the at least two quantization strengths and the information indicative of the one or more values of the quality parameter are assembled in a form of one or more streams into the encoded data (E2). Optionally, in this regard, the one or more data streams are included in a header within the encoded data (E2).

In a third aspect, embodiments of the present disclosure provide a method of decoding encoded data (E2) to generate corresponding decoded data (D3), via a decoder, wherein a data portion refers to a data block characterized in that the method includes:
  (a) receiving, within the encoded data (E2), information indicative of at least two quantization strengths and one or more values of a quality parameter employed with at least one encoding method during generation of a plurality of encoded data portions of the encoded data (E2), wherein during generation of at least two encoded data portions from amongst the plurality of encoded data portions, by employing at least one encoding method and at least two different quantization strengths, a same encoding method is employed with different quantization strengths for a same value of the quality parameter for the at least two encoded data portions;
  (b) using the information from (a) to apply an inverse of the at least one encoding method with the at least two quantization strengths and the one or more values of the quality parameter, to corresponding encoded data portions of the encoded data (E2) in a portion-specific manner to generate corresponding decoded data portions, wherein, for a given encoded data portion, an inverse of a corresponding given encoding method with a corresponding given quantization strength and a corresponding given value of the quality parameter is applied to the given encoded data portion to generate a corresponding decoded data portion; and
  (c) aggregating the decoded data portions to generate the decoded data (D3).

Optionally, the method includes receiving, within the encoded data (E2), information indicative of at least two quantization methods employed with the at least one encoding method during generation of the plurality of encoded data portions of the encoded data (E2), wherein at least two encoded data portions from amongst the plurality of encoded data portions are generated by employing a same encoding method, with different quantization strengths and different quantization methods for a same value of the quality parameter.

Optionally, the encoded data (E2) includes one or more data streams into which the information indicative of the at least two quantization strengths and the one or more values of the quality parameter employed during generation of the plurality of encoded data portions of the encoded data (E2) are assembled. Optionally, in this regard, the one or more data streams are received in a header included within the encoded data (E2).

Optionally, the at least one encoding method includes at least two encoding methods employed during generation of the plurality of encoded data portions.

Optionally, the method includes receiving, within the encoded data (E2), information indicative of the at least one encoding method employed during generation of the plurality of encoded data portions.

According to an embodiment of the present disclosure, for a given encoded data portion, at least two of: information indicative of a corresponding given encoding method, information indicative of a corresponding given quantization strength, and/or information indicative of a corresponding given value of the quality parameter are received together, namely as a single piece of information for the given encoded data portion. Optionally, in this regard, the method includes receiving at least two of: the information indicative of the at least one encoding method, information indicative of the at least two quantization strengths, and/or information indicative of the one or more values of the quality parameter into a single data stream.

According to another embodiment of the present disclosure, for a given encoded data portion, information indicative of a corresponding given encoding method, information indicative of a corresponding given quantization strength, and/or information indicative of a corresponding given value of the quality parameter are received separately, namely as separate pieces of information for the given encoded data portion. Optionally, in this regard, the method includes receiving the information indicative of the at least one encoding method, information indicative of the at least two quantization strengths, and information indicative of the one or more values of the quality parameter into separate data streams.

Optionally, information indicative of an encoding method employed during generation of a given encoded data portion and information indicative of a quantization strength employed during the generation of the given encoded data portion are received within a single piece of information, namely a single selection index or its identification number. During decoding, this single piece of information is utilized by the decoder to apply an inverse of the encoding method to the given encoded data portion with the quantization strength that has been employed when the encoded data (E2) was generated.

Optionally, the information indicative of the at least one encoding method, the information indicative of the at least two quantization strengths, and the information indicative of the one or more values of the quality parameter are received from a database or a data server.

Optionally, in the method, the encoded data (E2) includes encoded one-dimensional data. Alternatively, optionally, in the method, the encoded data (E2) includes encoded multi-dimensional data. Yet alternatively, the encoded data (E2) includes a mixture of encoded one-dimensional data and encoded multi-dimensional data, for example in a varying sequence of the encoded data (E2), such as audio, subtitles and images in the video data.

Optionally, in the method, the encoded data (E2) includes at least one of: encoded image data, encoded video data, encoded audio data, encoded biometric data, encoded genomic data, encoded medical measurement data, encoded sensor data, encoded surveillance data.

Optionally, in the method, the encoded data (E2) includes a plurality of data streams into which the plurality of encoded data portions are aggregated corresponding to different encoding methods and/or different quantization strengths employed.

Alternatively, optionally, in the method, the encoded data (E2) includes a single data stream in which the encoded data portions generated by different encoding methods and/or different quantization strengths are combined.

Moreover, the aforementioned method can be used in combination with multiple mutually different decoding methods and standards. As an example, the aforementioned method can be used with a data block decoder as described in a published UK patent document GB2505169B.

In a fourth aspect, embodiments of the present disclosure provide a decoder for decoding encoded data (E2) to generate corresponding decoded data (D3), and wherein the decoder includes a data processing arrangement for processing the encoded data (E2), wherein a data portion refers to a data block, characterized in that the decoder includes:

(a) an information decoding arrangement that is operable to receive, within the encoded data (E2), information indicative of at least two quantization strengths and one or more values of a quality parameter employed with at least one encoding method during generation of a plurality of encoded data portions of the encoded data (E2), wherein during generation of at least two encoded data portions from amongst the plurality of encoded data portions, by employing at least one encoding method and at least two different quantization strengths, a same encoding method is employed with different quantization strengths for a same value of the quality parameter for the at least two encoded data portions;

(b) a decoding arrangement that is operable to use the information from (a) to apply an inverse of the at least one encoding method with the at least two quantization strengths and the one or more values of the quality parameter, to corresponding encoded data portions of the encoded data (E2) in a portion-specific manner to generate corresponding decoded data portions, wherein, for a given encoded data portion, an inverse of a corresponding given encoding method with a corresponding given quantization strength and a corresponding given value of the quality parameter is applied to the given encoded data portion to generate a corresponding decoded data portion; and (c) an aggregator that is operable to aggregate the decoded data portions to generate the decoded data (D3).

Optionally, the information decoding arrangement is operable to receive, within the encoded data (E2), information indicative of at least two quantization methods employed with the at least one encoding method during generation of the plurality of encoded data portions of the encoded data (E2), wherein at least two encoded data portions from amongst the plurality of encoded data portions are generated by employing a same encoding method, with different quantization strengths and different quantization methods for a same value of the quality parameter.

Optionally, the encoded data (E2) includes a plurality of data streams into which the plurality of encoded data portions are aggregated corresponding to different encoding methods and/or different quantization strengths employed.

Optionally, the encoded data (E2) includes one or more data streams into which the information indicative of the at least two quantization strengths and the one or more values of the quality parameter employed during generation of the plurality of encoded data portions of the encoded data (E2) are assembled.

Optionally, the information decoding arrangement is operable to receive, within the encoded data (E2), information indicative of the at least one encoding method employed during generation of the plurality of encoded data portions.

According to an embodiment of the present disclosure, for a given encoded data portion, at least two of: information indicative of a corresponding given encoding method, information indicative of a corresponding given quantization strength, and/or information indicative of a corresponding given value of the quality parameter are received together, namely as a single piece of information for the given encoded data portion. Optionally, in this regard, the information decoding arrangement is operable to receive at least two of: the information indicative of the at least one encoding method, information indicative of the at least two quantization strengths, and/or information indicative of the one or more values of the quality parameter into a single data stream.

According to another embodiment of the present disclosure, for a given encoded data portion, information indicative of a corresponding given encoding method, information indicative of a corresponding given quantization strength, and/or information indicative of a corresponding given value of the quality parameter are received separately, namely as separate pieces of information for the given encoded data portion. Optionally, in this regard, the information decoding arrangement is operable to receive the information indicative of the at least one encoding method, information indicative of the at least two quantization strengths, and information indicative of the one or more values of the quality parameter into separate data streams.

Moreover, optionally, the encoded data (E2) includes at least one of: encoded image data, encoded video data, encoded audio data, encoded biometric data, encoded genomic data, encoded medical measurement data, encoded sensor data, encoded surveillance data, encoded multi-dimensional data.

In a fifth aspect, embodiments of the present disclosure provide a computer program product comprising a non-transitory computer-readable storage medium having computer-readable instructions stored thereon, the computer-readable instructions being executable by a computerized device comprising processing hardware to execute a method pursuant to the aforementioned first aspect.

Optionally, the computer-readable instructions are downloadable from a software application store, for example, from an "App store" to the computerized device.

In a sixth aspect, embodiments of the present disclosure provide a computer program product comprising a non-transitory computer-readable storage medium having computer-readable instructions stored thereon, the computer-readable instructions being executable by a computerized device comprising processing hardware to execute a method pursuant to the aforementioned third aspect.

Optionally, the computer-readable instructions are downloadable from a software application store, for example, from an "App store" to the computerized device.

In a seventh aspect, embodiments of the present disclosure provide a codec including at least one encoder pursuant to the aforementioned second aspect, and at least one decoder pursuant to the aforementioned fourth aspect. Optionally, there is employed at least one encoder and a plurality of decoders, for example as in a multi-casting content distribution system, for example as aforementioned.

An example codec has been provided in conjunction with FIG. 1, as explained in more detail below. The codec includes at least one encoder for encoding input data (D1) to generate corresponding encoded data (E2), and at least one decoder for decoding the encoded data (E2) to generate corresponding decoded data (D3).

Optionally, the decoded data (D3) is approximately similar to the input data (D1), as in a lossy mode of operation; by "approximately" is meant at least 50% similar, more optionally at least 90% similar, and yet more optionally at least 99% similar. Alternatively, optionally, the decoded data (D3) is different to the input data (D1), for example by way of a transformation, for example transcoding, but retains substantially similar information present in the input data (D1); for example, the decoded data (D3) is usefully made different to the input data (D1) when reformatting of the decoded data (D3) is also required, for example to be compatible with mutually different types of communication platforms, software layers, communication devices, and so forth.

The at least one encoder includes data processing hardware for processing the input data (D1) to generate the corresponding encoded data (E2) pursuant to embodiments of the present disclosure. Optionally, the data processing hardware of the at least one encoder is implemented by employing at least one Reduced Instruction Set Computing (RISC) processor that is operable to execute program instructions as elucidated earlier.

Furthermore, optionally, the at least one encoder is operable to communicate the encoded data (E2) to a data server and/or data storage for storing in a database. The data server and/or data storage is arranged to be accessible to the at least one decoder, which is beneficially compatible with the at least one encoder, for subsequently decoding the encoded data (E2). Optionally, the data server and/or data storage is a part of a peer-to-peer network for data distribution, wherein the encoded data (E2) is fragmented during transmission and delivered via a plurality of mutually different peer-to-peer communication paths. Such an approach makes it difficult for third parties to eavesdrop, for example for stealing data content for unauthorized redistribution (for example, a pirate distribution of copyright material, videos, films, and such like).

In some examples, the at least one decoder is optionally operable to access the encoded data (E2) from the data server and/or data storage.

In alternative examples, the at least one encoder is optionally operable to stream the encoded data (E2) to the at least one decoder, either via a data communication network or via a direct connection. Moreover, it will be appreciated that a device equipped with a hardware-based or software-based encoder can also communicate directly with another device equipped with a hardware-based or software-based decoder. By such an approach, it is feasible to employ peer-to-peer networks of encoders that can assist in communicating the encoded data (E2). Moreover, such peer-to-peer operation also enables an encoding task to be shared between a plurality of encoders that operate in combination, namely to generate the encoded data (E2), and optionally to distribute the encoded data (E2) to one or more decoders, for example in a manner of a peer-to-peer multicasting arrangement.

In yet other alternative examples, the at least one decoder is optionally implemented so as to retrieve the encoded data (E2) from a non-transitory (namely non-transient) computer-readable storage medium, such as a hard drive, an optical disc and/or a Solid-State Drive (SSD).

The at least one decoder includes data processing hardware for processing the encoded data (E2) to generate the corresponding decoded data (D3) pursuant to embodiments of the present disclosure. Optionally, the data processing hardware of the at least one decoder is implemented by employing at least one RISC processor that is operable to execute program instructions as elucidated earlier; such a RISC processor is capable of performing relatively simpler concatenated operations at a very high speed, and is suitable for decoding data provided in a streamed format, for example in real-time.

When embodiments of the present disclosure are implemented in a multicasting manner, there is a plurality of such decoders that are employed. Optionally, a given decoder also functions as a relay station for passing the encoded data (E2) to other decoders, for example utilizing data memory of the given decoder as a data buffer. Such an approach is capable of reducing data flow overload occurring in data communication networks when streaming high-quality video data content.

Optionally, the at least one encoder and the at least one decoder are both present within a single device, for example for enabling bi-directional communication of the encoded data (E2) to be achieved. In such a case, the at least one encoder and the at least one decoder collectively constitute the codec. For example, such a codec is beneficially employed in bi-directional video conferencing apparatus.

Alternatively, optionally, the codec is effectively implemented between multiple devices. Optionally, the codec is implemented as custom-design digital hardware, for example via use of one or more Application-Specific Integrated Circuits (ASIC's). Alternatively or additionally, optionally, the codec is implemented using computing hardware that is operable to execute program instructions, for example provided to the computing hardware on a non-transient (non-transitory) machine-readable data carrier.

As an example, the at least one encoder and/or the at least one decoder can be beneficially employed in consumer electronics apparatus, wireless communication apparatus and associated systems, digital cameras, smart phones, tablet computers, personal computers, scientific measuring apparatus, communications equipment, video-conferencing equipment, satellites, but not limited thereto.

Next, embodiments of the present disclosure will be described with reference to figures.

Referring to FIG. 1, embodiments of the present disclosure concern:
(i) an encoder 110 for encoding input data (D1) to generate corresponding encoded data (E2), and corresponding methods of encoding the input data (D1) to generate the corresponding encoded data (E2);
(ii) a decoder 120 for decoding the encoded data (E2) to generate corresponding decoded data (D3), and corresponding methods of decoding the encoded data (E2) to generate the corresponding decoded data (D3); and
(iii) a codec 130 including a combination of at least one encoder and at least one decoder, namely a combination of the encoder 110 and the decoder 120.

FIG. 1 is merely an example, which should not unduly limit the scope of the claims herein. It is to be understood that the specific designation for the codec 130 is provided as an example and is not to be construed as limiting the codec 130 to specific numbers, types, or arrangements of encoders and decoders. A person skilled in the art will recognize many variations, alternatives, and modifications of embodiments of the present disclosure. The encoder 110 and the decoder 120 are operable to employ methods of encoding data and methods of decoding data as described in the foregoing.

Figure 2:
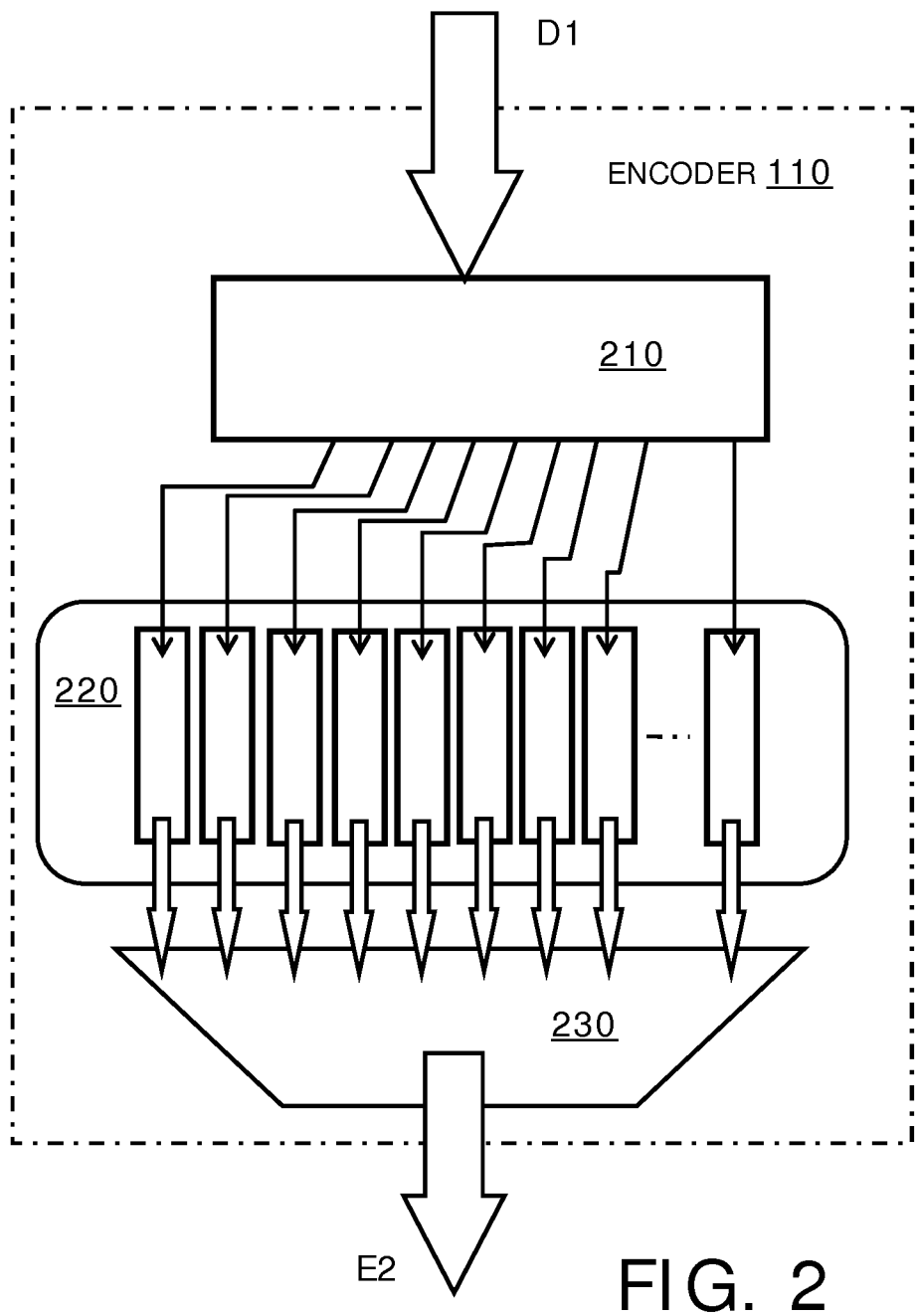
FIG. 2 is a schematic illustration of the encoder of FIG. 1 and various components thereof, in accordance with an embodiment of the present disclosure.

Referring now to FIG. 2, there is provided a schematic illustration of the encoder 110 and various components thereof, in accordance with an embodiment of the present disclosure. The encoder 110 includes an analyser 210, an encoding arrangement 220, and an aggregator 230.

The encoder 110 is operable to set one or more values of a quality parameter for a plurality of data portions of input data (D1) in a portion-specific manner, as described earlier.

The analyser 210 is operable to analyse the plurality of data portions and to select at least one encoding method and at least two quantization strengths to be employed for encoding the plurality of data portions in a portion-specific manner.

The encoding arrangement 220 is operable to encode the plurality of data portions to generate corresponding encoded data portions, as described earlier. In this regard, at least two data portions from amongst the plurality of data portions are encoded by employing a same encoding method, whilst employing different quantization strengths for a same value of the quality parameter that has been set for the at least two data portions.

Optionally, the encoding arrangement 220 is operable to use parallelization for encoding the plurality of data portions substantially simultaneously, as shown in FIG. 2.

The aggregator 230 is operable to aggregate the encoded data portions to generate the encoded data (E2).

The encoder 110 is operable to assemble information indicative of the at least two quantization strengths and information indicative of the one or more values of the quality parameter into the encoded data (E2).

FIG. 2 is merely an example, which should not unduly limit the scope of the claims herein. It is to be understood that the specific designation for the encoder 110 is provided as an example and is not to be construed as limiting the encoder 110 to specific numbers, types, or arrangements of its components. A person skilled in the art will recognize many variations, alternatives, and modifications of embodiments of the present disclosure.

Figure 3:
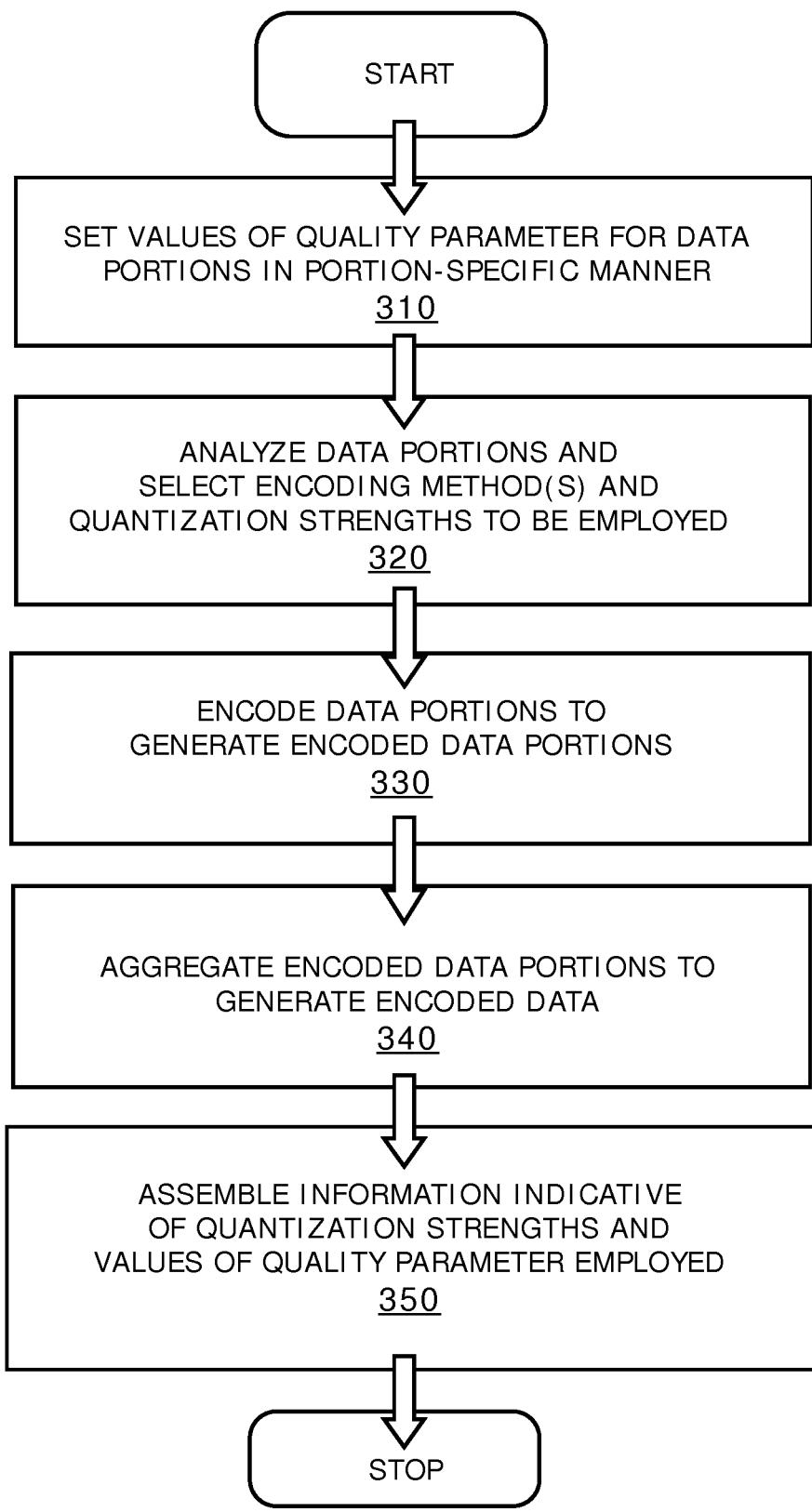
FIG. 3 is a schematic illustration of a flow chart depicting steps of a method of encoding input data (D1) to generate corresponding encoded data (E2), via the encoder of FIG. 1, in accordance with an embodiment of the present disclosure.

Referring now to FIG. 3, there is provided a flow chart depicting steps of a method of encoding input data (D1) to generate corresponding encoded data (E2), in accordance with an embodiment of the present disclosure. The method is depicted as a collection of steps in a logical flow diagram, which represents a sequence of steps that can be implemented in hardware, software, or a combination thereof, for example as aforementioned.

The method is implemented via an encoder.

At a step 310, one or more values of a quality parameter are set for a plurality of data portions of input data (D1) in a portion-specific manner, as described earlier.

At a step 320, the plurality of data portions are analysed to select at least one encoding method, and at least two quantization strengths to be employed for encoding the plurality of data portions, as described earlier.

Next, at a step 330, the plurality of data portions are encoded to generate corresponding encoded data portions, by applying the at least one selected encoding method and the at least two selected quantization strengths to their corresponding data portions of the input data (D1). In this regard, at least two data portions from amongst the plurality of data portions are encoded by employing a same encoding method, whilst employing different quantization strengths for a same value of the quality parameter that has been set for the at least two data portions at the step 310.

At a step 340, the encoded data portions are aggregated to generate the encoded data (E2).

At a step 350, information indicative of the at least two quantization strengths and information indicative of the one or more values of the quality parameter are assembled into the encoded data (E2).

The step 350 can also be performed simultaneously with or before the steps 330 and 340.

The steps 310 to 350 are only illustrative and other alternatives can also be provided where one or more steps are added, one or more steps are removed, or one or more steps are provided in a different sequence without departing from the scope of the claims herein.

Figure 4:
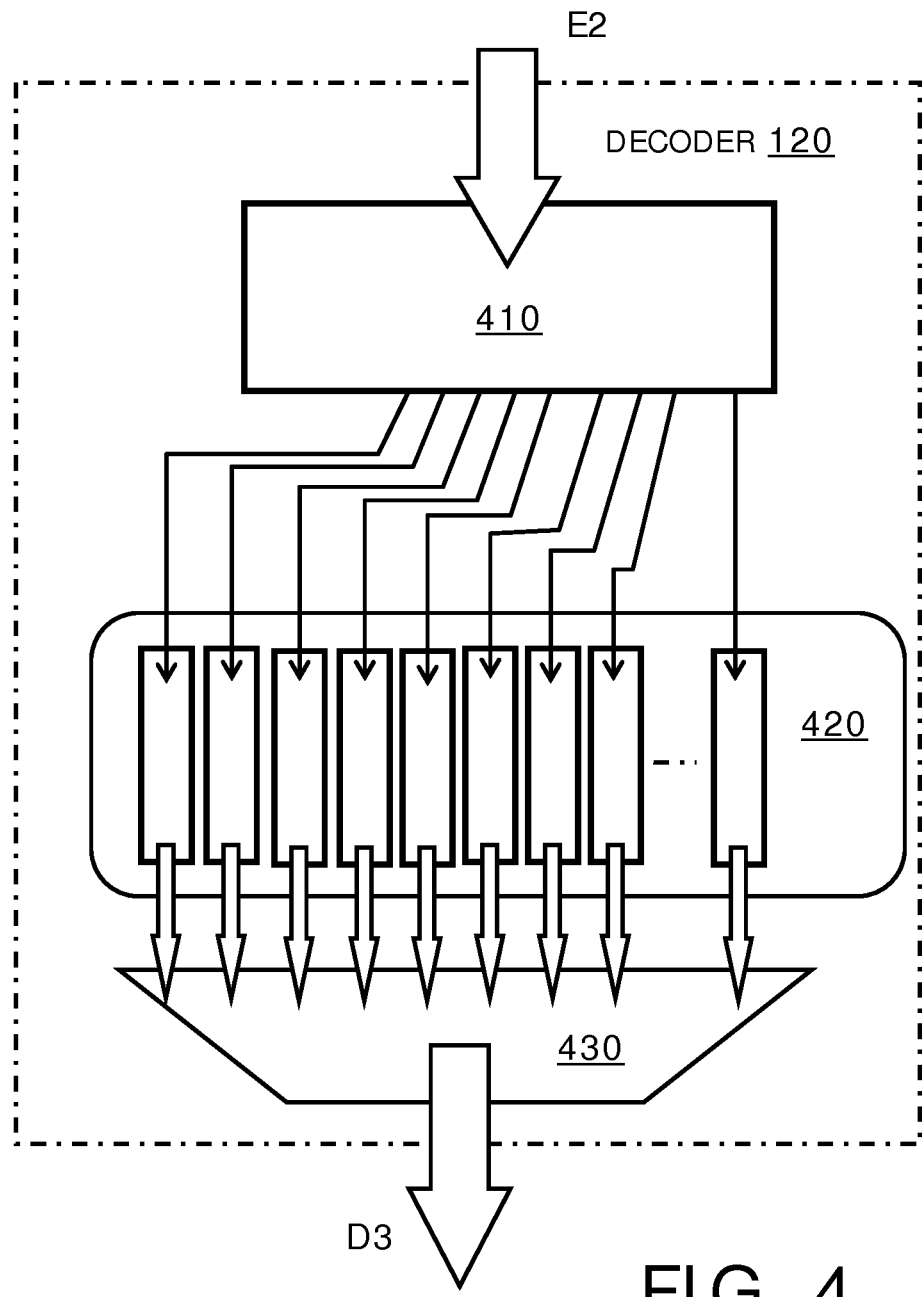
FIG. 4 is a schematic illustration of the decoder of FIG. 1 and various components thereof, in accordance with an embodiment of the present disclosure.

Referring next to FIG. 4, there is provided a schematic illustration of the decoder 120 and various components thereof, in accordance with an embodiment of the present disclosure. The decoder 120 includes an information decoding arrangement 410, a decoding arrangement 420, and an aggregator 430.

The information decoding arrangement 410 is operable to receive, within the encoded data (E2), information indicative of at least two quantization strengths and one or more values of a quality parameter employed with at least one encoding method during generation of a plurality of encoded data portions of the encoded data (E2).

The decoding arrangement 420 is operable to use the information to apply an inverse of the at least one encoding method with the at least two quantization strengths and the one or more values of the quality parameter, to their corresponding encoded data portions of the encoded data (E2) to generate corresponding decoded data portions.

Optionally, the decoding arrangement 420 is operable to use parallelization for decoding the plurality of encoded data portions of the encoded data (E2) substantially simultaneously, as shown in FIG. 4.

The aggregator 430 is operable to aggregate the decoded data portions to generate the decoded data (D3).

FIG. 4 is merely an example, which should not unduly limit the scope of the claims herein. It is to be understood that the specific designation for the decoder 120 is provided as an example and is not to be construed as limiting the decoder 120 to specific numbers, types, or arrangements of its components. A person skilled in the art will recognize many variations, alternatives, and modifications of embodiments of the present disclosure.

Figure 5:
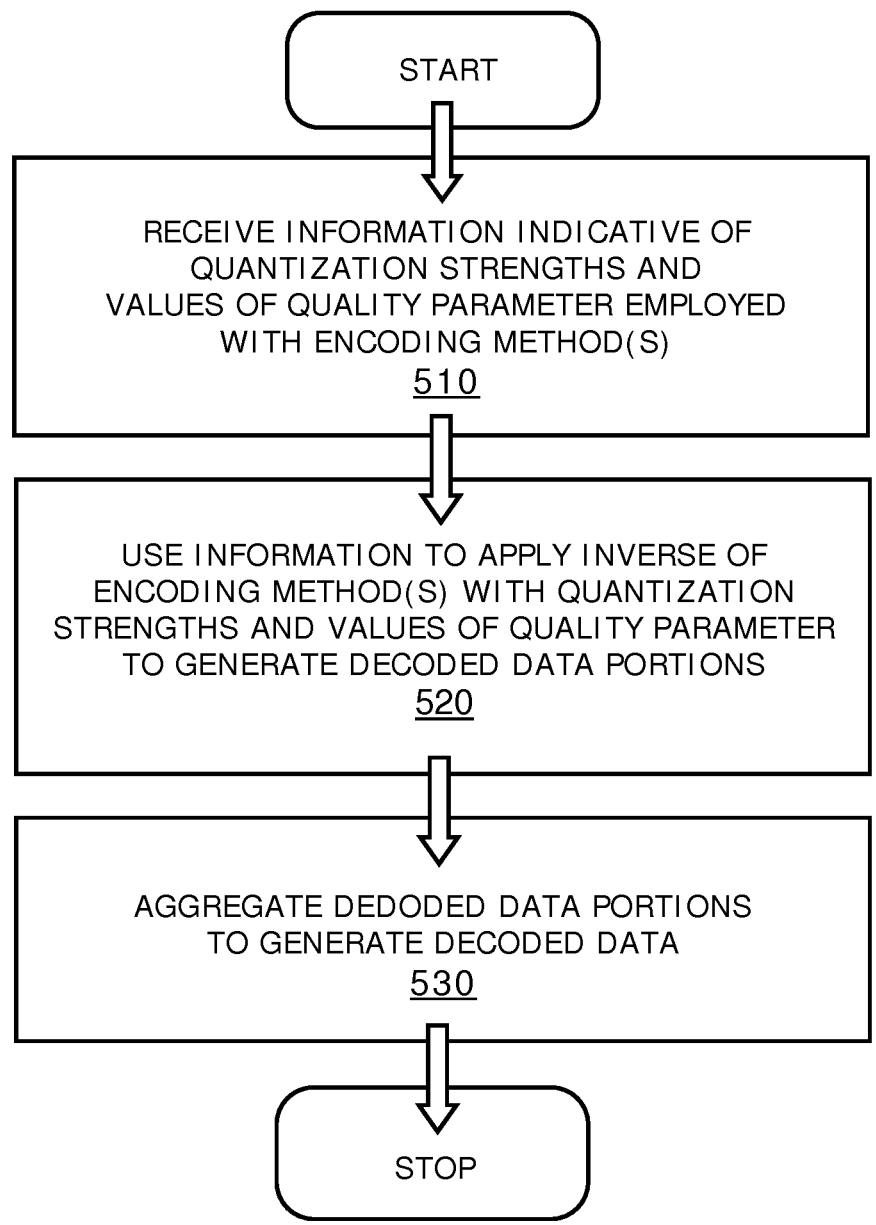
FIG. 5 is a schematic illustration of a flow chart depicting steps of a method of decoding encoded data (E2) to generate corresponding decoded data (D3), via the decoder of FIG. 1, in accordance with an embodiment of the present disclosure.

Referring now to FIG. 5, there is provided a flow chart depicting steps of a method of decoding encoded data (E2) to generate corresponding decoded data (D3), in accordance with an embodiment of the present disclosure. The method is depicted as a collection of steps in a logical flow diagram, which represents a sequence of steps that can be implemented in hardware, software, or a combination thereof, for example as aforementioned.

The method is implemented via a decoder.

At a step 510, information indicative of at least two quantization strengths and one or more values of a quality parameter employed with at least one encoding method during generation of a plurality of encoded data portions of the encoded data (E2) is received within the encoded data (E2).

At a step 520, the information is used to apply an inverse of the at least one encoding method with the at least two quantization strengths and the one or more values of the quality parameter, to their corresponding encoded data portions of the encoded data (E2) to generate corresponding decoded data portions.

At a step 530, the decoded data portions are aggregated to generate the decoded data (D3).

The steps 510 to 530 are only illustrative and other alternatives can also be provided where one or more steps are added, one or more steps are removed, or one or more steps are provided in a different sequence without departing from the scope of the claims herein.

Figure 6:
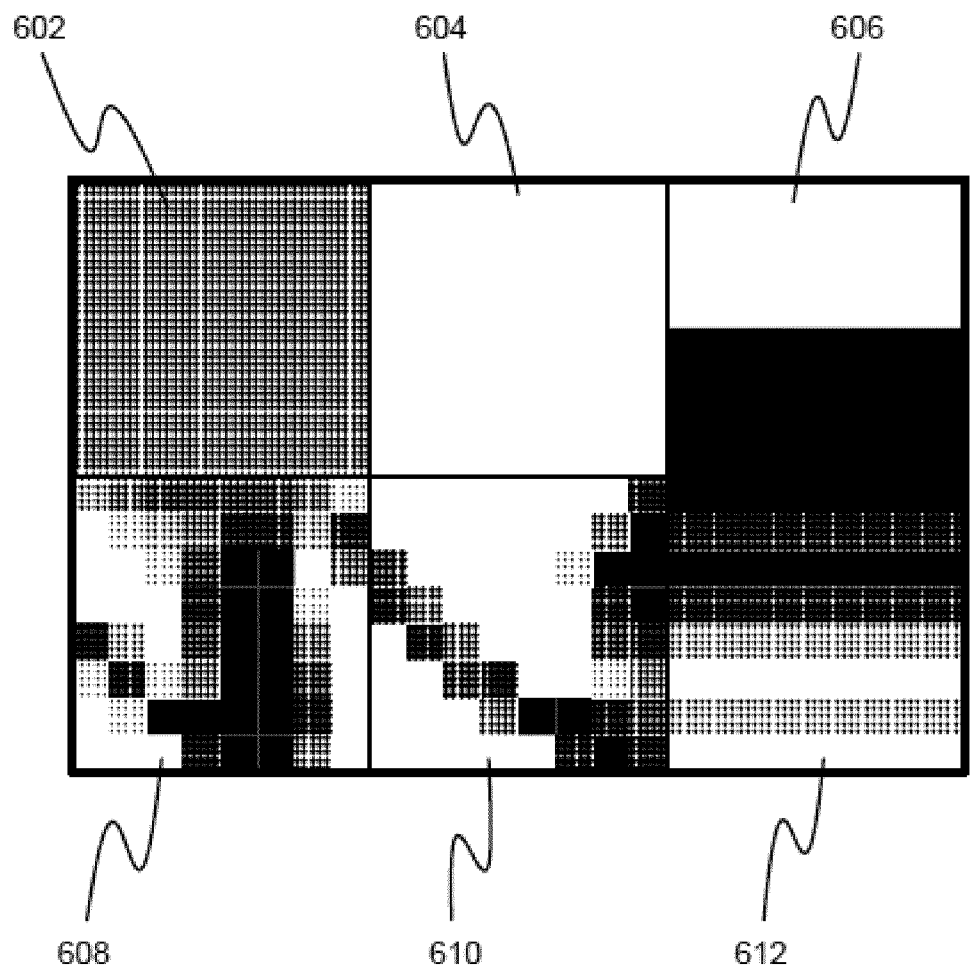
FIG. 6 is an example image that is encoded and subsequently decoded pursuant to embodiments of the present disclosure.

Referring now to FIG. 6, there is provided an example of encoding an example image and subsequently decoding of the example image, pursuant to embodiments of the present disclosure.

In FIG. 6, there is shown a black-coloured (black-colored) boundary to mark properly borders of the example image. It will be appreciated that the black-coloured (black-colored) boundary is not a part of the example image.

The size of the example image is 24×16 pixels, wherein the example image is split into six data blocks each having a block size of 8×8 pixels. The six data blocks have been depicted as a first data block 602, a second data block 604, a third data block 606, a fourth data block 608, a fifth data block 610, and a sixth data block 612.

There are 27 mutually different methods available for encoding and quantizing the data portions, the selection indices and identification numbers of which are as follows:
an identification number "0" for a selection index "DCTQL",
an identification number "1" for a selection index "DCTQM",
an identification number "2" for a selection index "DCTQH",
an identification number "3" for a selection index "DC1",
an identification number "4" for a selection index "DC2",
an identification number "5" for a selection index "DC3",
an identification number "6" for a selection index "DC4",
an identification number "7" for a selection index "DC5",
an identification number "8" for a selection index "DC6",
an identification number "9" for a selection index "DC7",
an identification number "10" for a selection index "DC8",
an identification number "11" for a selection index "LineH1",
an identification number "12" for a selection index "LineH2",
an identification number "13" for a selection index "LineH3",
an identification number "14" for a selection index "LineH4",
an identification number "15" for a selection index "LineH5",
an identification number "16" for a selection index "LineH6",
an identification number "17" for a selection index "LineH7",
an identification number "18" for a selection index "LineH8",
an identification number "19" for a selection index "LineV1",
an identification number "20" for a selection index "LineV2",
an identification number "21" for a selection index "LineV3",
an identification number "22" for a selection index "LineV4",
an identification number "23" for a selection index "LineV5",
an identification number "24" for a selection index "LineV6",
an identification number "25" for a selection index "LineV7", and
an identification number "26" for a selection index "LineV8".

The selection index "DCTQL" indicates that DCT transformed data values will be quantized with a low quantization strength, so as to produce a high quality in accordance with a given quality parameter, thereby producing a high quality reconstruction. Correspondingly, the selection index "DCTQM" indicates a medium quantization strength, thereby producing a medium quality reconstruction, and the selection index "DCTQH" indicates a high quantization strength, thereby producing a low quality reconstruction. The numbers in the selection indices of DC, LineH and LineV methods indicate that data values produced by these methods will be quantized to have a bit depth stated by their respective numbers. For example, the selection index "LineV7" indicates that the data values of vertical block lines will be quantized to have a bit depth of "7"; in other words, there will be 2 to the power of 7 or 128 possible data values after quantization.

In the illustrated example, the quality parameter has a value of 75. This indicates that it is desired to achieve a fairly high quality decoded image. The range of values of the quality parameter is between 1 (for the most inferior quality) and 100 (for lossless quality). For the quality parameter value of 75, the value of the Lagrangian multiplier "L" is set to 0.9671. The bit count "Bits" used in encoding a given data block will thus be multiplied by "L", as the Rate Distortion (RD) value is computed using the following formula:

$$RD = SSE + L * Bits,$$

wherein "SSE" indicates the sum of the squared errors between the pixels of an original data block and its corresponding decoded data block.

As all the pixel values of the first data block 602 are $153_{10}$ (=$99_{16}$=$10011001_2$), it is beneficial to encode and quantize the first data block 602 using an encoding method and quantization denoted by the selection index "DC4". This will produce the value $9_{10}$ (=$9_{16}$=$1001_2$) when quantized to a bit depth of 4 bits. In other words, using the DC method and the quantization to 4 bits, lossless result will be achieved; in other words, the value of SSE will be 0 (zero), because the de-quantization of the value "9" will produce the original value "153". Using a larger number of bits to represent the result would not improve the reconstruction; it would merely waste bits unnecessarily, and possibly cause reconstruction errors. Using a smaller number of bits to represent the result would always cause reconstruction errors, the damage of which would not be compensated for by saving one bit or a few bits, because the value of the Lagrangian multiplier "L" is only 0.9671. For example, if an encoding method, a quantization method and a quantization strength denoted by the selection index "DC3" were selected, then the quantized value would be $4_{10}$ ($=4_{16}=100_2$), and when the quantized value is de-quantized, the resulting value would be $146_{10}$ ($=92_{16}=10010010_2$). This distortion would mean that the SSE would be 3136 ($=64*7*7$). Therefore, saving one bit would in no case yield benefits as regards the RD value ($=3136-0.9671*1$).

The second data block 604 is such that it is beneficial to be encoded and quantized using an encoding method, a quantization method and a quantization strength denoted by the selection index "DC1". All the original values in the second data block 604 are $255_{10}$ ($=FF_{16}=11111111_2$), which means that the quantized value will be $1_{10}$ ($=1_{16}=1_2$). When this value is decoded, the original value 255 is regained. As a result, there will be no squared errors for the second data block 604.

As regards the third data block 606, its original values are such that it is beneficial to be encoded and quantized using an encoding method, a quantization method and a quantization strength denoted by the selection index "LineH1", with which the values of eight consecutive horizontal block lines top-down are 1 1 1 1 0 0 0 0. This means that the reconstruction is again lossless.

Next, the encoding and quantizing to be employed for the fourth data block 608 and the fifth data block 610 will be described. For comparison purposes, the fourth data block 608 and the fifth data block 610 have been encoded and quantized using encoding methods, quantization methods and quantization strengths denoted by the selection indices "DCTQH", "DCTQM" and "DCTQL". In the illustrated example, the quality parameter value of 75 defines that the quantization method corresponding to the selection index "DCTQL" will be dividing data values by two, the quantization method corresponding to the selection index "DCTQM" will be dividing the data values by four, and the quantization method corresponding to the selection index "DCTQH" will be dividing the data values by eight. It will be appreciated that if the quality parameter value of 95 were used, the values of the divisors could be, for example, 1, 2 and 4. Correspondingly, if the quality parameter value of 10 were used, the values of the divisor could be, for example, 6, 11 and 20.

Original data values of pixels of the fourth data block 608 are provided as follows:
(182, 153, 119, 119, 119, 119, 153, 204, 255, 204, 182, 153, 73, 73, 182, 73, 255, 255, 204, 119, 0, 0, 255, 153, 255, 255, 255, 73, 0, 0, 204, 255, 73, 182, 255, 119, 0, 0, 153, 255, 204, 73, 204, 153, 0, 0, 119, 255, 255, 204, 0, 0, 0, 0, 73, 255, 255, 255, 255, 73, 0, 0, 153, 255)

DCT-transformed data values (X) for the fourth data block 608 are provided as follows:
(1122, 195, 480, −289, −12, 88, −32, 54, 78, 4, −136, 104, −58, 60, −55, 9, −5, 11, −13, 148, 53, −51, −1, −32, −91, −133, −103, 2, 103, −28, 72, −42, 65, −43, −9, −101, −56, −60, 34, 29, −32, −29, 123, 78, 59, −67, −20, −23, 49, −20, −21, −66, −1, 71, 26, 26, −54, −44, 4, −3, −24, −50, −54, −28)

Upon quantizing the above DCT-transformed data values using the quantization method and the quantization strength denoted by the selection index "DCTQL", namely dividing by two ($Y=X/2$), quantized transform values are obtained as follows:
(561, 97, 240, −144, −6, 44, −16, 27, 39, 2, −68, 52, −29, 30, −27, 4, −2, 5, −6, 74, 26, −25, 0, −16, −45, −66, −51, 1, 51, −14, 36, −21, 32, −21, −4, −50, −28, −30, 17, 14, −16, −14, 61, 39, 29, −33, −10, −11, 24, −10, −10, −33, 0, 35, 13, 13, −27, −22, 2, −1, −12, −25, −27, −14)

These quantized transform values (namely, frequency coefficients) can be coded with, for example, 416 bits: by using zig-zag scanning; by signaling 10-bit DC values separately; by signaling sign bits for AC values separately; and by coding original 10-bit AC values with zero-run Variable-Length Code (VLC) coding (see reference [14]). For the other quantized transform values in the example, required bit counts are computed in a similar manner. It should be noted that if a value is quantized more (i.e., the value is represented with less bits), then the DC and AC values would originally have, for example, 9 bits (when the divisor is 4) or 8 bits (when the divisor is 8).

When de-quantized, the quantized transform values are multiplied by two ($X'=Y*2$) to obtain de-quantized transform values as follows:
(1122, 194, 480, −288, −12, 88, −32, 54, 78, 4, −136, 104, −58, 60, −54, 8, −4, 10, −12, 148, 52, −50, 0, −32, −90, −132, −102, 2, 102, −28, 72, −42, 64, −42, −8, −100, −56, −60, 34, 28, −32, −28, 122, 78, 58, −66, −20, −22, 48, −20, −20, −66, 0, 70, 26, 26, −54, −44, 4, −2, −24, −50, −54, −28)

Subsequent decoding of the de-quantized transform values, by applying an inverse of the DCT transform, yields decoded data values as follows:
(184, 153, 119, 119, 117, 120, 153, 204, 255, 203, 182, 154, 73, 74, 182, 74, 254, 254, 203, 119, 0, 0, 254, 153, 255, 255, 254, 73, 0, 0, 204, 254, 74, 182, 254, 118, 0, 0, 152, 255, 204, 74, 204, 152, 0, 0, 119, 255, 254, 204, 2, 0, 1, 0, 74, 254, 255, 254, 254, 73, 0, 0, 153, 255)

Based on these decoded data values, the value of the sum of the squared errors (SSE) is computed as 35. Therefore, the RD value is 437.3136 ($=35+0.9671*416$) when the encoding method, the quantization method and the quantization strength denoted by the selection index "DCTQL" is used for the fourth data block 608.

Likewise, when the DCT-transformed data values are quantized using the quantization method and the quantization strength denoted by the selection index "DCTQM", namely dividing by four ($Y=X/4$), quantized transform values are obtained as follows:
(280, 49, 120, −72, −3, 22, −8, 13, 19, 1, −34, 26, −14, 15, −14, 2, −1, 3, −3, 37, 13, −13, 0, −8, −23, −33, −26, 0, 26, −7, 18, −10, 16, −11, −2, −25, −14, −15, 8, 7, −8, −7, 31, 19, 15, −17, −5, −6, 12, −5, −5, −16, 0, 18, 6, 6, −13, −11, 1, −1, −6, −12, −13, −7)

These quantized transform values (namely, frequency coefficients) can be coded with for example 367 bits.

When de-quantized, these quantized transform values are multiplied by four ($X'=Y*4$) to obtain de-quantized transform values as follows:
(1120, 196, 480, −288, −12, 88, −32, 52, 76, 4, −136, 104, −56, 60, −56, 8, −4, 12, −12, 148, 52, −52, 0, −32, −92, −132, −104, 0, 104, −28, 72, −40, 64, −44, −8, −100, −56, −60, 32, 28, −32, −28, 124, 76, 60, −68, −20, −24, 48, −20, −20, −64, 0, 72, 24, 24, −52, −44, 4, −4, −24, −48, −52, −28)

Subsequent decoding of these de-quantized transform values, by applying an inverse of the DCT transform, yields decoded data values as follows:
(183, 153, 117, 120, 117, 118, 151, 204, 255, 203, 182, 152, 73, 73, 181, 72, 255, 254, 202, 121, 0, 1, 255, 153, 254, 255, 252, 73, 0, 0, 203, 255, 73, 180, 255, 119, 0, 0, 153, 254, 204, 73, 203, 153, 0, 0, 119, 253, 255, 204, 4, 0, 0, 0, 71, 255, 255, 255, 254, 72, 0, 2, 154, 254)

Based on these decoded data values, the value of the sum of the squared errors (SSE) is computed as 78. Therefore, the RD value is 432.9257 (=78+0.9671*367) when the encoding method, the quantization method and the quantization strength denoted by the selection index "DCTQM" is used.

Similarly, when the DCT-transformed data values are quantized using the quantization method and the quantization strength denoted by the selection index "DCTQH", namely dividing by eight (Y=X/8), quantized transform values are obtained as follows:
(140, 24, 60, −36, −1, 11, −4, 7, 10, 0, −17, 13, −7, 7, −7, 1, −1, 1, −2, 18, 7, −6, 0, −4, −11, −17, −13, 0, 13, −3, 9, −5, 8, −5, −1, −13, −7, −7, 4, 4, −4, −4, 15, 10, 7, −8, −2, −3, 6, −2, −3, −8, 0, 9, 3, 3, −7, −5, 0, 0, −3, −6, −7, −3)

These quantized transform values (namely, frequency coefficients) can be coded with for example 323 bits.

When de-quantized, these quantized transform values are multiplied by eight (X'=Y*8) to obtain de-quantized transform values as follows:
(1120, 192, 480, −288, −8, 88, −32, 56, 80, 0, −136, 104, −56, 56, −56, 8, −8, 8, −16, 144, 56, −48, 0, −32, −88, −136, −104, 0, 104, −24, 72, −40, 64, −40, −8, −104, −56, −56, 32, 32, −32, −32, 120, 80, 56, −64, −16, −24, 48, −16, −24, −64, 0, 72, 24, 24, −56, −40, 0, 0, −24, −48, −56, −24)

Subsequent decoding of these de-quantized transform values, by applying an inverse of the DCT transform, yields decoded data values as follows:
(180, 147, 119, 123, 120, 117, 155, 205, 253, 204, 179, 151, 75, 73, 181, 81, 255, 255, 200, 118, 3, 1, 251, 149, 255, 255, 254, 70, 0, 2, 205, 255, 76, 183, 255, 117, 2, 0, 155, 253, 205, 73, 203, 154, 0, 1, 120, 255, 253, 198, 1, 0, 0, 2, 74, 254, 255, 253, 255, 74, 0, 0, 151, 253)

Based on these decoded data values, the value of the sum of the squared errors (SSE) is computed as 317. Therefore, the RD value is 629.3733 (=317+0.9671*323) when the encoding method, the quantization method and the quantization strength denoted by the selection index "DCTQH" is used.

Now, considering similar calculations for the fifth data block 610, original data values of pixels of the fifth data block 610 are provided as follows:
(255, 255, 255, 255, 255, 255, 255, 73, 255, 255, 255, 255, 255, 255, 153, 0, 119, 255, 255, 255, 255, 204, 0, 0, 73, 153, 255, 255, 255, 255, 73, 0, 255, 73, 153, 255, 255, 255, 119, 73, 255, 255, 119, 73, 255, 255, 204, 153, 255, 255, 255, 153, 0, 0, 73, 119, 255, 255, 255, 255, 255, 73, 0, 73)

DCT-transformed data values (X) for the fifth data block 610 are provided as follows:
(1468, 366, −266, 110, −29, −27, 28, −2, 134, −54, −187, 96, −102, 37, −10, −20, 77, 142, 120, −89, −4, 21, −66, 31, 95, −147, 201, 131, −25, 70, −29, 31, 41, −51, −133, 24, 69, 54, 26, 12, −82, 13, 47, −138, −83, 3, −7, −11, 55, −50, −29, 64, 4, −116, −34, 13, −54, 56, 22, −63, 64, 55, 26, −27)

Upon quantizing the above DCT-transformed data values using the quantization method and the quantization strength denoted by the selection index "DCTQL", namely dividing by two (Y=X/2), quantized transform values are obtained as follows:
(734, 183, −133, 55, −14, −13, 14, −1, 67, −27, −93, 48, −51, 18, −5, −10, 38, 71, 60, −44, −2, 10, −33, 15, 47, −73, 100, 65, −12, 35, −14, 15, 20, −25, −66, 12, 34, 27, 13, 6, −41, 6, 23, −69, −41, 1, −3, −5, 27, −25, −14, 32, 2, −58, −17, 6, −27, 28, 11, −31, 32, 27, 13, −13)

These quantized transform values (namely, frequency coefficients) can be coded with for example 433 bits.

When de-quantized, the quantized transform values are multiplied by two (X'=Y*2) to obtain de-quantized transform values as follows:
(1468, 366, −266, 110, −28, −26, 28, −2, 134, −54, −186, 96, −102, 36, −10, −20, 76, 142, 120, −88, −4, 20, −66, 30, 94, −146, 200, 130, −24, 70, −28, 30, 40, −50, −132, 24, 68, 54, 26, 12, −82, 12, 46, −138, −82, 2, −6, −10, 54, −50, −28, 64, 4, −116, −34, 12, −54, 56, 22, −62, 64, 54, 26, −26)

Subsequent decoding of these de-quantized transform values, by applying an inverse of the DCT transform, yields decoded data values as follows:
(255, 254, 254, 254, 254, 255, 253, 73, 255, 255, 255, 255, 255, 255, 154, 0, 120, 255, 254, 255, 255, 204, 1, 1, 73, 153, 255, 255, 255, 255, 74, 1, 255, 73, 154, 255, 255, 254, 120, 72, 255, 254, 119, 75, 253, 255, 204, 154, 254, 253, 255, 154, 2, 1, 73, 119, 255, 255, 254, 255, 254, 73, 1, 72)

Based on these decoded data values, the value of the sum of the squared errors (SSE) is computed as 44. Therefore, the RD value is 462.7543 (=44+0.9671*433) when the encoding method, the quantization method and the quantization strength denoted by the selection index "DCTQL" is used.

Likewise, when the DCT-transformed data values are quantized using the quantization method and the quantization strength denoted by the selection index "DCTQM", namely dividing by four (Y=X/4), quantized transform values are obtained as follows:
(367, 91, −66, 27, −7, −7, 7, 0, 33, −13, −47, 24, −25, 9, −2, −5, 19, 35, 30, −22, −1, 5, −16, 8, 24, −37, 50, 33, −6, 17, −7, 8, 10, −13, −33, 6, 17, 13, 6, 3, −20, 3, 12, −34, −21, 1, −2, −3, 14, −12, −7, 16, 1, −29, −8, 3, −13, 14, 5, −16, 16, 14, 6, −7)

These quantized transform values (namely, frequency coefficients) can be coded with for example 382 bits.

When de-quantized, these quantized transform values are multiplied by four (X'=Y*4) to obtain de-quantized transform values as follows:
(1468, 364, −264, 108, −28, −28, 28, 0, 132, −52, −188, 96, −100, 36, −8, −20, 76, 140, 120, −88, −4, 20, −64, 32, 96, −148, 200, 132, −24, 68, −28, 32, 40, −52, −132, 24, 68, 52, 24, 12, −80, 12, 48, −136, −84, 4, −8, −12, 56, −48, −28, 64, 4, −116, −32, 12, −52, 56, 20, −64, 64, 56, 24, −28)

Subsequent decoding of these de-quantized transform values, by applying an inverse of the DCT transform, yields decoded data values as follows:
(255, 254, 255, 253, 255, 255, 253, 75, 255, 252, 255, 253, 255, 253, 151, 1, 121, 255, 255, 255, 254, 203, 0, 0, 73, 154, 253, 253, 254, 254, 74, 1, 253, 74, 153, 255, 255, 252, 120, 74, 255, 255, 120, 72, 255, 255, 204, 155, 254, 254, 255, 153, 1, 1, 77, 120, 254, 255, 255, 253, 254, 72, 2, 74)

Based on these decoded data values, the value of the sum of the squared errors (SSE) is computed as 109. Therefore, the RD value is 478.4322 (=109+0.9671*382) when the encoding method, the quantization method and the quantization strength denoted by the selection index "DCTQM" is used.

Similarly, when the DCT-transformed data values are quantized using the quantization method and the quantization strength denoted by the selection index "DCTQH", namely dividing by eight (Y=X/8), quantized transform values are obtained as follows:

(183, 46, −33, 14, −4, −3, 3, 0, 17, −7, −23, 12, −13, 5, −1, −2, 10, 18, 15, −11, 0, 3, −8, 4, 12, −18, 25, 16, −3, 9, −4, 4, 5, −6, −17, 3, 9, 7, 3, 1, −10, 2, 6, −17, −10, 0, −1, −1, 7, −6, −4, 8, 0, −14, −4, 2, −7, 7, 3, −8, 8, 7, 3, −3)

These quantized transform values (namely, frequency coefficients) can be coded with for example 336 bits.

When de-quantized, these quantized transform values are multiplied by eight (X'=Y*8) to obtain de-quantized transform values as follows:
(1464, 368, −264, 112, −32, −24, 24, 0, 136, −56, −184, 96, −104, 40, −8, −16, 80, 144, 120, −88, 0, 24, −64, 32, 96, −144, 200, 128, −24, 72, −32, 32, 40, −48, −136, 24, 72, 56, 24, 8, −80, 16, 48, −136, −80, 0, −8, −8, 56, −48, −32, 64, 0, −112, −32, 16, −56, 56, 24, −64, 64, 56, 24, −24)

Subsequent decoding of these de-quantized transform values, by applying an inverse of the DCT transform, yields decoded data values as follows:
(255, 253, 255, 255, 255, 251, 255, 70, 255, 254, 255, 252, 252, 255, 156, 2, 119, 253, 255, 249, 254, 204, 4, 0, 73, 155, 251, 254, 255, 255, 71, 0, 251, 74, 150, 255, 251, 250, 121, 70, 253, 255, 122, 73, 254, 254, 206, 149, 255, 255, 252, 150, 2, 0, 72, 119, 255, 254, 253, 255, 254, 74, 0, 69)

Based on these decoded data values, the value of the sum of the squared errors (SSE) is computed as 304. Therefore, the RD value is 628.9456 (=304+0.9671*336) when the encoding method, the quantization method and the quantization strength denoted by the selection index "DCTQH" is used.

It is evident from the above calculations of the RD values that it is beneficial to encode and quantize the fourth data block 608 and the fifth data block 610 using the DCT-based method, the quantization method and the quantization strength denoted by the selection indices "DCTQM" and "DCTQL", respectively. Other alternative methods presented in the illustrated example would cause a large amount of squared errors, and therefore, would not be selected even though required bit counts would be very small for the fourth data block 608 and the fifth data block 610.

As regards the sixth data block 612, different LineH alternatives can be considered, horizontal block lines of the sixth data block 612 contain following values (top-down): $0_{10}$ (=$00_{16}$=$00000000_2$), $73_{10}$ (=$49_{16}$=$01001001_2$), $182_{10}$ (=$B6_{16}$=$10110110_2$), $255_{10}$ (=$FF_{16}$=$11111111_2$), 182, 255. The encoding method, the quantization method and the quantization strength denoted by the selection index "LineH8" would thus use 8*7=56 bits and the SSE would be zero. Therefore, the RD value would be 0+0.9671*64=61.8944. The encoding method, the quantization method and the quantization strength denoted by the selection index "LineH7" would use 8*7=56 bits, but the original values 73 and 182 would be reconstructed into values $72_{10}$ (=$48_{16}$=$01001000_2$) and $183_{10}$ (=$B7_{16}$=$10110111_2$), respectively, which would cause an error of one value in 32 (=4×8) pixels. Thus, the RD value would be 32*1*1+0.9671*56=86.1576. If a larger quantization strength is used (namely, the data values are represented with less bits), then there would be even more errors, and therefore, it is beneficial to select the encoding method the quantization method and the quantization strength denoted by the selection index "LineH8" for the sixth data block 612.

Thus, the encoding methods, the quantization methods and the quantization strengths selected for each of the six data blocks of the example image are, in an order from the first data block 602 to the sixth data block 612, indicated by their respective selection indices as follows:
DC4, DC1, LineH1, DCTQM, DCTQL and LineH8.

These selection indices can be signalled and delivered in a data stream using their respective identification numbers as follows:
6, 3, 11, 1, 0, 18.

As there are 27 mutually different methods available, information indicative of the selected encoding methods, the selected quantization methods and the selected quantization strengths, namely the identification numbers of the selection indices can be delivered as five-bit values. Thus, the information indicative of the selected encoding methods, the selected quantization methods and the selected quantization strengths are optionally delivered as single pieces of information for each of the six data blocks of the example image.

Furthermore, in cases when there are a large number of data blocks and some of the available methods are used more often than other available methods, it is beneficial to entropy-encode the information indicative of the selected encoding methods, the selected quantization methods and the selected quantization strengths of each individual data block in a single combined data stream, using for example Range coding (see reference [15]) or VLC coding (see reference [14]).

Correspondingly, it is often beneficial to produce for each selected method, its own sequence of data into its own data stream, and then to entropy-encode all those streams separately. However, in the illustrated example, as there were only a few data blocks and each of the data blocks was encoded with a different method, it is beneficial to deliver all the identification numbers of the selection indices and the sequences of data that these different methods produce into one bit stream without entropy-encoding them, as follows:
00110 (6), 1001 (9), 00011 (3), 1 (1), 01011 (11) 1 1 1 1 0 0 0 0, 00001 (1), 367 bits of DCTQM-coded data, 00000 (0), 433 bits of DCTQL-coded data, 10010 (18), 00000000 (0), 01001001 (73), 00000000 (0), 01001001 (73), 10110110 (182), 11111111 (255), 10110110 (182), 11111111 (255).

Thus, the data of all the six data blocks can be encoded with 9+6+13+372+438+69=907 bits, and the sum of squared errors in the reconstruction will be in total 0+0+0+78+44+0=122. The RD value for the entire image will thus be 122+0.9671*907=999.1597, when these six methods are used.

In the illustrated example, three mutually different encoding methods, namely DC, DCT and LineH, were used, and all of these encoding methods were used with two mutually different quantization strengths. As a result, each of the six data blocks of the example image was encoded with a different combination of transformation and quantization. The selection indices of these selected combinations were signaled or delivered in each case with only a single piece of selection information, namely an identification number expressed by a single five-bit value per data block.

It will be appreciated that information indicative of the selected encoding methods and information indicative of the selected quantization methods and the selected quantization strengths can be delivered separately, namely as mutually separate pieces of information. In such a case, there would have been four different selection indices for the transformations DCT, DC, LineH and LineV, for example with identification numbers as follows:
an identification number "0" for a selection index "DCT",
an identification number "1" for a selection index "DC",
an identification number "2" for a selection index "LineH", and
an identification number "3" for a selection index "LineV".

Thus, the information indicative of the selected encoding methods could be signalled with two bits.

Correspondingly, there would have been three quantization alternatives available for the DCT method, for example represented as follows:
an identification number "0" for a quantization "QL",
an identification number "1" for a quantization "QM", and
an identification number "2" for a quantization "QH".

Thus, the information indicative of the selected quantizations could be signaled, for example, in a VLC-coded format as QL='0', QM='11' and QH='10'.

Moreover, there were eight mutually different quantization alternatives available for the other encoding methods, namely for DC, LineH and LineV. Therefore, the quantization alternatives could be signaled using three bits, that is, values 0 to 7 being signaled by "000" to "111".

Thus, the information indicative of the selected encoding methods and the information indicative of the selected quantization methods and the selected quantization strengths could be signaled, for example, as follows:
01 (1), 011 (4), 01 (1) 000 (1), 10 (2), 000 (1), 00 (0), 0 (QM), 00 (0), 11 (QH), 10 (2), 111 (8).

In such a case, 3 bits (=30–27) would be saved as compared to a case when the information indicative of the selected encoding methods and the information indicative of the selected quantization methods and the selected quantization strengths are delivered together, namely as a single piece of information. However, it is often more beneficial to signal or deliver these two pieces of information as one combined piece of information.

Notably, optionally, even in this alternative, the information indicative of the selected encoding methods and the information indicative of the selected quantization methods and the selected quantization strengths could be delivered into their own data streams, after which they could be entropy-encoded for all the data blocks at one go.

It will be appreciated that there can also be many other encoding method alternatives available, and therefore, the encoding of the example image of FIG. 6 could be further improved using the other encoding method alternatives. However, with the 27 mutually different methods available in the illustrated example, the example image could not be encoded so that smaller RD values could be achieved, when the desired value of the quality parameter is 75, and the Lagrangian multiplier is set to 0.9671.

FIG. 6 is merely an example, which should not unduly limit the scope of the claims herein. A person skilled in the art will recognize many variations, alternatives, and modifications of embodiments of the present disclosure.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The phrases "in an embodiment", "according to an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

It will be appreciated that phrases such as "at least one of" and "one or more" in the foregoing are to be interpreted to define the singular for a given example embodiment, and to define the plurality for another given example embodiment. For example, "one or more" can be interpreted to relate to a plurality in an example embodiment.

REFERENCES

[1] Discrete cosine transform—Wikipedia, the free encyclopedia (accessed Jul. 10, 2016);
URL: http://en.wikipedia.org/wiki/Discrete_cosine_transform
[2] Inverse scattering transform—Wikipedia, the free encyclopedia (accessed Jul. 10, 2016);
URL: http://en.wikipedia.org/wiki/Inverse_scattering_transform
[3] Discrete sine transform—Wikipedia, the free encyclopedia (accessed Jul. 10, 2016);
URL: http://en.wikipedia.org/wiki/Discrete sine transform
[4] Discrete Fourier Transform—Wikipedia, the free encyclopedia (accessed Jul. 10, 2016);
URL: http://en.wikipedia.org/wiki/Discrete Fourier transform
[5] Fast Fourier transform—Wikipedia, the free encyclopedia (accessed Jul. 10, 2016);
URL: http://en.wikipedia.org/wiki/Fast Fourier transform
[6] Wavelet—Wikipedia, the free encyclopedia (accessed Jul. 10, 2016);
URL: http://en.wikipedia.org/wiki/Wavelet
[7] Hadamard transform—Wikipedia, the free encyclopedia (accessed Jul. 10, 2016);
URL: http://en.wikipedia.org/wiki/Hadamard_transform
[8] JPEG—Wikipedia, the free encyclopedia (accessed Jul. 10, 2016);
URL: http://en.wikipedia.org/wiki/JPEG
[9] H.264/MPEG-4 AVC—Wikipedia, the free encyclopedia (accessed Jul. 10, 2016);
URL: http://en.wikipedia.org/wiki/H.264/MPEG-4_AVC
[10] High Efficiency Video Coding—Wikipedia, the free encyclopedia (accessed Jul. 10, 2016);
URL: http://en.wikipedia.org/wiki/High_Efficiency_Video_Coding
[11] MP3—Wikipedia, the free encyclopedia (accessed Jul. 10, 2016);
URL: http://en.wikipedia.org/wiki/MP3
[12] Quantization (signal processing)—Wikipedia, the free encyclopedia (accessed Jul. 10, 2016);
URL: http://en.wikipedia.org/wiki/Quantization_(signal_processing)
[13] Rate-distortion optimization—Wikipedia, the free encyclopedia (accessed Jul. 10, 2016);
URL: http://en.wikipedia.org/wiki/Rate-distortion_optimization
[14] Variable-length code—Wikipedia, the free encyclopedia (accessed Jul. 10, 2016);
URL: http://en.wikipedia.org/wiki/Variable-length code
[15] Range encoding—Wikipedia, the free encyclopedia (accessed Jul. 10, 2016);
URL: http://en.wikipedia.org/wiki/Range_encoding

I claim:

1. A method of encoding input data to generate corresponding encoded data, via an encoder, wherein the input data includes a plurality of data portions, wherein a data portion refers to a data block, characterized in that the method includes:
   (a) setting one or more values of a quality parameter for the plurality of data portions in a portion-specific manner, such that a given data portion has a corresponding given value of the quality parameter;
   (b) analysing the plurality of data portions and selecting at least one encoding method and at least two different quantization strengths to be employed for encoding the plurality of data portions, wherein, for a given data portion, a corresponding given encoding method and a corresponding given quantization strength are selected to be employed for encoding the given data portion, the corresponding given encoding method and the corresponding given quantization strength being selected based upon a given value of the quality parameter set for the given data portion at (a);
   (c) encoding, by employing at least one encoding method and at least two different quantization strengths selected at (b), the plurality of data portions to generate corresponding encoded data portions, wherein at least two data portions from amongst the plurality of data portions are encoded by employing a same encoding method from amongst the at least one encoding method selected at (b), whilst employing different quantization strengths, for a same value of the quality parameter that has been set for the at least two data portions at (a);
   (d) aggregating the encoded data portions to generate the encoded data; and
   (e) assembling information indicative of the at least two quantization strengths and information indicative of the one or more values of the quality parameter into the encoded data.

2. A method as claimed in claim 1, characterized in that the at least one encoding method to be employed for encoding the plurality of data portions is selected from amongst a plurality of encoding methods, wherein the method further includes assembling information indicative of the at least one encoding method into the encoded data.

3. A method as claimed in claim 1, characterized in that the at least one encoding method includes at least two encoding methods to be employed for encoding the plurality of data portions, wherein the method further includes assembling information indicative of the at least two encoding methods into the encoded data.

4. A method as claimed in claim 2, characterized in that, for a given data portion, at least two of: information indicative of a corresponding given encoding method, information indicative of a corresponding given quantization strength, and/or information indicative of a corresponding given value of the quality parameter are assembled together as a single piece of information for the given data portion.

5. A method as claimed in claim 4, characterized in that the method includes assembling at least two of: the information indicative of the at least one encoding method, the information indicative of the at least two quantization strengths, and/or the information indicative of the one or more values of the quality parameter into a single data stream.

6. A method as claimed in claim 2, characterized in that, for a given data portion, information indicative of a corresponding given encoding method, information indicative of a corresponding given quantization strength, and/or information indicative of a corresponding given value of the quality parameter are assembled separately as separate pieces of information for the given data portion.

7. A method as claimed in claim 6, characterized in that the method includes assembling the information indicative of the at least one encoding method, the information indicative of the at least two quantization strengths, and the information indicative of the one or more values of the quality parameter into separate data streams.

8. A method as claimed in claim 1, characterized in that the method further includes selecting at least two quantization methods to be employed for encoding the plurality of data portions, wherein at least two data portions from amongst the plurality of data portions are encoded by employing a same encoding method, whilst employing different quantization strengths and different quantization methods for a same value of the quality parameter that has been set for the at least two data portions at (a).

9. A method as claimed in claim 1, characterized in that the encoded data portions are aggregated into a plurality of data streams included within the encoded data, based upon different encoding methods and/or different quantization strengths employed.

10. A method as claimed in claim 1, characterized in that the information indicative of the at least two quantization strengths and the information indicative of the one or more values of the quality parameter are assembled in a form of one or more data streams into the encoded data.

11. A method as claimed in claim 1, characterized in that the input data includes at least one of: image data, video data, audio data, biometric data, genomic data, medical measurement data, sensor data, surveillance data, multi-dimensional data.

12. A method as claimed in claim 1, characterized in that the at least two quantization strengths are selected in a dynamic manner, based upon one or more characteristics of the plurality of data portions of the input data.

13. An encoder for encoding input data to generate corresponding encoded data, wherein the input data includes a plurality of data portions, wherein a data portion refers to a data block, and wherein the encoder includes a data processing arrangement for processing the input data, characterized in that:
   (a) the encoder is operable to set one or more values of a quality parameter for the plurality of data portions in a portion-specific manner, such that a given data portion has a corresponding given value of the quality parameter;
   (b) the encoder includes an analyser that is operable to analyse the plurality of data portions and to select at least one encoding method and at least two different quantization strengths to be employed for encoding the plurality of data portions, wherein, for a given data portion, a corresponding given encoding method and a corresponding given quantization strength are selected to be employed for encoding the given data portion, the corresponding given encoding method and the corresponding given quantization strength being selected based upon a given value of the quality parameter set for the given data portion at (a);
   (c) the encoder includes an encoding arrangement that is operable to encode, by employing at least one encoding method and at least two different quantization strengths selected at (b), the plurality of data portions to generate corresponding encoded data portions wherein at least two data portions from amongst the plurality of data portions are encoded by employing a same encoding method from amongst the at least one encoding method selected at (b), whilst employing different quantization strengths, for a same value of the quality parameter that has been set for the at least two data portions at (a);

(d) the encoder includes an aggregator that is operable to aggregate the encoded data portions to generate the encoded data; and (e) the encoder is operable to assemble information indicative of the at least two quantization strengths and information indicative of the one or more values of the quality parameter into the encoded data.

14. An encoder as claimed in claim 13, characterized in that the analyser is operable to select the at least one encoding method to be employed for encoding the plurality of data portions from amongst a plurality of encoding methods, wherein the encoder is operable to assemble information indicative of the at least one encoding method into the encoded data.

15. An encoder as claimed in claim 13, characterized in that the at least one encoding method includes at least two encoding methods to be employed for encoding the plurality of data portions, wherein the encoder is operable to assemble information indicative of the at least two encoding methods into the encoded data.

16. An encoder as claimed in claim 14, characterized in that for a given data portion, at least two of: information indicative of a corresponding given encoding method, information indicative of a corresponding given quantization strength, and/or information indicative of a corresponding given value of the quality parameter are assembled together as a single piece of information for the given data portion.

17. An encoder as claimed in claim 16, characterized in that the encoder is operable to assemble at least two of: the information indicative of the at least one encoding method, the information indicative of the at least two quantization strengths, and/or the information indicative of the one or more values of the quality parameter into a single data stream.

18. An encoder as claimed in claim 14, characterized in that, for a given data portion, information indicative of a corresponding given encoding method, information indicative of a corresponding given quantization strength, and/or information indicative of a corresponding given value of the quality parameter are assembled separately as separate pieces of information for the given data portion.

19. An encoder as claimed in claim 18, characterized in that the encoder is operable to assemble the information indicative of the at least one encoding method, the information indicative of the at least two quantization strengths, and the information indicative of the one or more values of the quality parameter into separate data streams.

20. An encoder as claimed in claim 13, characterized in that the encoder is operable to select at least two quantization methods to be employed for encoding the plurality of data portions, wherein at least two data portions from amongst the plurality of data portions are encoded by employing a same encoding method, whilst employing different quantization strengths and different quantization methods for a same value of the quality parameter that has been set for the at least two data portions at (a).

21. An encoder as claimed in claim 13, characterized in that the aggregator is operable to aggregate the encoded data portions into a plurality of data streams included within the encoded data, based upon different encoding methods and/or different quantization strengths employed.

22. An encoder as claimed in claim 13, characterized in that the information indicative of the at least two quantization strengths and the information indicative of the one or more values of the quality parameter are assembled in a form of one or more streams into the encoded data.

23. An encoder as claimed in claim 13, characterized in that the input data includes at least one of: image data, video data, audio data, biometric data, genomic data, medical measurement data, sensor data, surveillance data, multi-dimensional data.

24. An encoder as claimed in claim 13, characterized in that the analyser is operable to select the at least two quantization strengths in a dynamic manner, based upon one or more characteristics of the plurality of data portions of the input data.

25. A method of decoding encoded data to generate corresponding decoded data, via a decoder, wherein a data portion refers to a data block characterized in that the method includes:

(a) receiving, within the encoded data, information indicative of at least two quantization strengths and one or more values of a quality parameter employed with at least one encoding method during generation of a plurality of encoded data portions of the encoded data, wherein during generation of at least two encoded data portions from amongst the plurality of encoded data portions, by employing at least one encoding method and at least two different quantization strengths, a same encoding method is employed with different quantization strengths for a same value of the quality parameter for the at least two encoded data portions;

(b) using the information from (a) to apply an inverse of the at least one encoding method with the at least two quantization strengths and the one or more values of the quality parameter, to corresponding encoded data portions of the encoded data in a portion-specific manner to generate corresponding decoded data portions, wherein, for a given encoded data portion, an inverse of a corresponding given encoding method with a corresponding given quantization strength and a corresponding given value of the quality parameter is applied to the given encoded data portion to generate a corresponding decoded data portion; and (c) aggregating the decoded data portions to generate the decoded data.

26. A method as claimed in claim 25, characterized in that the method includes receiving, within the encoded data, information indicative of at least two quantization methods employed with the at least one encoding method during generation of the plurality of encoded data portions of the encoded data, wherein at least two encoded data portions from amongst the plurality of encoded data portions are generated by employing a same encoding method, with different quantization strengths and different quantization methods for a same value of the quality parameter.

27. A method as claimed in claim 25, characterized in that the encoded data includes a plurality of data streams into which the plurality of encoded data portions are aggregated corresponding to different encoding methods and/or different quantization strengths employed.

28. A method as claimed in claim 25, characterized in that the encoded data includes one or more data streams into which the information indicative of the at least two quantization strengths and the one or more values of the quality parameter employed during generation of the plurality of encoded data portions of the encoded data are assembled.

29. A method as claimed in claim 25, characterized in that the method includes receiving, within the encoded data, information indicative of the at least one encoding method employed during generation of the plurality of encoded data portions.

30. A method as claimed in claim 29, characterized in that, for a given encoded data portion, at least two of: information indicative of a corresponding given encoding method, information indicative of a corresponding given quantization strength, and/or information indicative of a corresponding given value of the quality parameter are received together as a single piece of information for the given encoded data portion.

31. A method as claimed in claim 30, characterized in that the method includes receiving at least two of: the information indicative of the at least one encoding method, information indicative of the at least two quantization strengths, and/or information indicative of the one or more values of the quality parameter into a single data stream.

32. A method as claimed in claim 29, characterized in that, for a given encoded data portion, information indicative of a corresponding given encoding method, information indicative of a corresponding given quantization strength, and/or information indicative of a corresponding given value of the quality parameter are received separately as separate pieces of information for the given encoded data portion.

33. A method as claimed in claim 32, characterized in that the method includes receiving the information indicative of the at least one encoding method, information indicative of the at least two quantization strengths, and information indicative of the one or more values of the quality parameter into separate data streams.

34. A method as claimed in claim 25, characterized in that the encoded data includes at least one of: encoded image data, encoded video data, encoded audio data, encoded biometric data, encoded genomic data, encoded medical measurement data, encoded sensor data, encoded surveillance data, encoded multi-dimensional data.

35. A decoder for decoding encoded data to generate corresponding decoded data, and wherein the decoder includes a data processing arrangement for processing the encoded data, wherein a data portion refers to a data block, characterized in that the decoder includes:
(a) an information decoding arrangement that is operable to receive, within the encoded data, information indicative of at least two quantization strengths and one or more values of a quality parameter employed with at least one encoding method during generation of a plurality of encoded data portions of the encoded data, wherein during generation of at least two encoded data portions from amongst the plurality of encoded data portions, by employing at least one encoding method and at least two different quantization strengths, a same encoding method is employed with different quantization strengths for a same value of the quality parameter for the at least two encoded data portions;
(b) a decoding arrangement that is operable to use the information from (a) to apply an inverse of the at least one encoding method with the at least two quantization strengths and the one or more values of the quality parameter, to corresponding encoded data portions of the encoded data in a portion-specific manner to generate corresponding decoded data portions, wherein, for a given encoded data portion, an inverse of a corresponding given encoding method with a corresponding given quantization strength and a corresponding given value of the quality parameter is applied to the given encoded data portion to generate a corresponding decoded data portion; and
(c) an aggregator that is operable to aggregate the decoded data portions to generate the decoded data.

36. A decoder as claimed in claim 35, characterized in that the information decoding arrangement is operable to receive, within the encoded data, information indicative of at least two quantization methods employed with the at least one encoding method during generation of the plurality of encoded data portions of the encoded data, wherein at least two encoded data portions from amongst the plurality of encoded data portions are generated by employing a same encoding method, with different quantization strengths and different quantization methods for a same value of the quality parameter.

37. A decoder as claimed in claim 35, characterized in that the encoded data includes a plurality of data streams into which the plurality of encoded data portions are aggregated corresponding to different encoding methods and/or different quantization strengths employed.

38. A decoder as claimed in claim 35, characterized in that the encoded data includes one or more data streams into which the information indicative of the at least two quantization strengths and the one or more values of the quality parameter employed during generation of the plurality of encoded data portions of the encoded data are assembled.

39. A decoder as claims in claim 35, characterized in that the information decoding arrangement is operable to receive, within the encoded data, information indicative of the at least one encoding method employed during generation of the plurality of encoded data portions.

40. A decoder as claimed in claim 39, characterized in that, for a given encoded data portion, at least two of: information indicative of a corresponding given encoding method, information indicative of a corresponding given quantization strength, and/or information indicative of a corresponding given value of the quality parameter are received together as a single piece of information for the given encoded data portion.

41. A decoder as claimed in claim 40, characterized in that the information decoding arrangement is operable to receive at least two of: the information indicative of the at least one encoding method, information indicative of the at least two quantization strengths, and/or information indicative of the one or more values of the quality parameter into a single data stream.

42. A decoder as claimed in claim 39, characterized in that, for a given encoded data portion, information indicative of a corresponding given encoding method, information indicative of a corresponding given quantization strength, and/or information indicative of a corresponding given value of the quality parameter are received separately as separate pieces of information for the given encoded data portion.

43. A decoder as claimed in claim 42, characterized in that the information decoding arrangement is operable to receive the information indicative of the at least one encoding method, information indicative of the at least two quantization strengths, and information indicative of the one or more values of the quality parameter into separate data streams.

44. A decoder as claimed in claim 35, characterized in that the encoded data includes at least one of: encoded image data, encoded video data, encoded audio data, encoded biometric data, encoded genomic data, encoded medical measurement data, encoded sensor data, encoded surveillance data, encoded multi-dimensional data.

45. A computer program product comprising a non-transitory computer-readable storage medium having computer-readable instructions stored thereon, the computer-readable instructions being executable by a computerized device comprising processing hardware to execute a method as claimed in claim 1.

46. A computer program product comprising a non-transitory computer-readable storage medium having computer-readable instructions stored thereon, the computer-readable instructions being executable by a computerized device comprising processing hardware to execute a method as claimed in claim 25.

47. A codec including at least one encoder as claimed in claim 13, and at least one decoder as claimed in claim 35.

* * * * *